(12) United States Patent
Yoshida et al.

(10) Patent No.: US 12,434,524 B2
(45) Date of Patent: Oct. 7, 2025

(54) SLIP STATE DETECTION APPARATUS AND SUSPENSION CONTROL APPARATUS

(71) Applicant: Hitachi Astemo, Ltd., Hitachinaka (JP)

(72) Inventors: Yuki Yoshida, Hitachinaka (JP); Ryusuke Hirao, Hitachinaka (JP); Shingo Nasu, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/274,068

(22) PCT Filed: Jan. 20, 2022

(86) PCT No.: PCT/JP2022/001879
§ 371 (c)(1),
(2) Date: Jul. 25, 2023

(87) PCT Pub. No.: WO2022/163471
PCT Pub. Date: Aug. 4, 2022

(65) Prior Publication Data
US 2025/0018760 A1 Jan. 16, 2025

(30) Foreign Application Priority Data
Jan. 27, 2021 (JP) .................................. 2021-011007

(51) Int. Cl.
*B60G 17/016* (2006.01)
(52) U.S. Cl.
CPC ...... *B60G 17/016* (2013.01); *B60G 2400/106* (2013.01); *B60G 2400/208* (2013.01); *B60G 2400/252* (2013.01)
(58) Field of Classification Search
CPC ............ B60G 17/016; B60G 2400/106; B60G 2400/208; B60G 2400/252
See application file for complete search history.

(56) References Cited

U.S. PATENT DOCUMENTS

| 10,850,586 B2 * | 12/2020 | Sorniotti .......... B60G 17/01908 |
| 2002/0147532 A1 * | 10/2002 | Inagaki .................. B62D 7/159 |
| | | 701/91 |

(Continued)

FOREIGN PATENT DOCUMENTS

| JP | 2003-306093 | 10/2003 |
| JP | 2015-51719 | 3/2015 |

OTHER PUBLICATIONS

Written Opinion of the International Searching Authority issued Mar. 1, 2022 in International Application No. PCT/JP2022/001879, with English translation.

(Continued)

*Primary Examiner* — Toan C To
(74) *Attorney, Agent, or Firm* — Wenderoth, Lind & Ponack, L.L.P.

(57) ABSTRACT

A suspension control apparatus includes a slip state detection apparatus configured to detect a slip state of a wheel. The slip state detection apparatus includes a tire characteristic-considered slip ratio determination portion configured to determine a tire characteristic-considered slip ratio, which is a coefficient for correcting a slip ratio of the wheel determined based on a rotational velocity signal of the wheel, based on a longitudinal acceleration of a vehicle detected by a longitudinal acceleration detection portion and a tire characteristic; and a corrected slip ratio determination portion configured to determine a corrected slip ratio of the wheel by correcting the slip ratio of the wheel according to the tire characteristic-considered slip ratio.

4 Claims, 10 Drawing Sheets

(56) References Cited

U.S. PATENT DOCUMENTS

| | | | |
|---|---|---|---|
| 2003/0192375 A1 | 10/2003 | Sugai et al. | |
| 2006/0074530 A1* | 4/2006 | Meyers | B60K 23/0808 |
| | | | 701/1 |
| 2009/0105921 A1* | 4/2009 | Hanatsuka | B60G 17/0165 |
| | | | 701/80 |
| 2010/0241305 A1* | 9/2010 | Itabashi | B60G 17/018 |
| | | | 701/29.2 |
| 2019/0263210 A1* | 8/2019 | Nasu | B60T 8/172 |
| 2020/0039315 A1* | 2/2020 | Minakuchi | B60G 17/0195 |
| 2020/0062069 A1* | 2/2020 | Sorniotti | B60G 17/01908 |
| 2020/0331317 A1* | 10/2020 | Nasu | B60W 10/184 |
| 2021/0283969 A1* | 9/2021 | Danielson | B60G 17/0165 |
| 2021/0379954 A1* | 12/2021 | Bremmer | B60G 17/0165 |
| 2022/0063365 A1* | 3/2022 | Chetty | B60W 10/22 |
| 2022/0063366 A1* | 3/2022 | Minakuchi | B60W 30/02 |

OTHER PUBLICATIONS

International Search Report issued Mar. 1, 2022 in International Application No. PCT/JP2022/001879, with English translation.

* cited by examiner

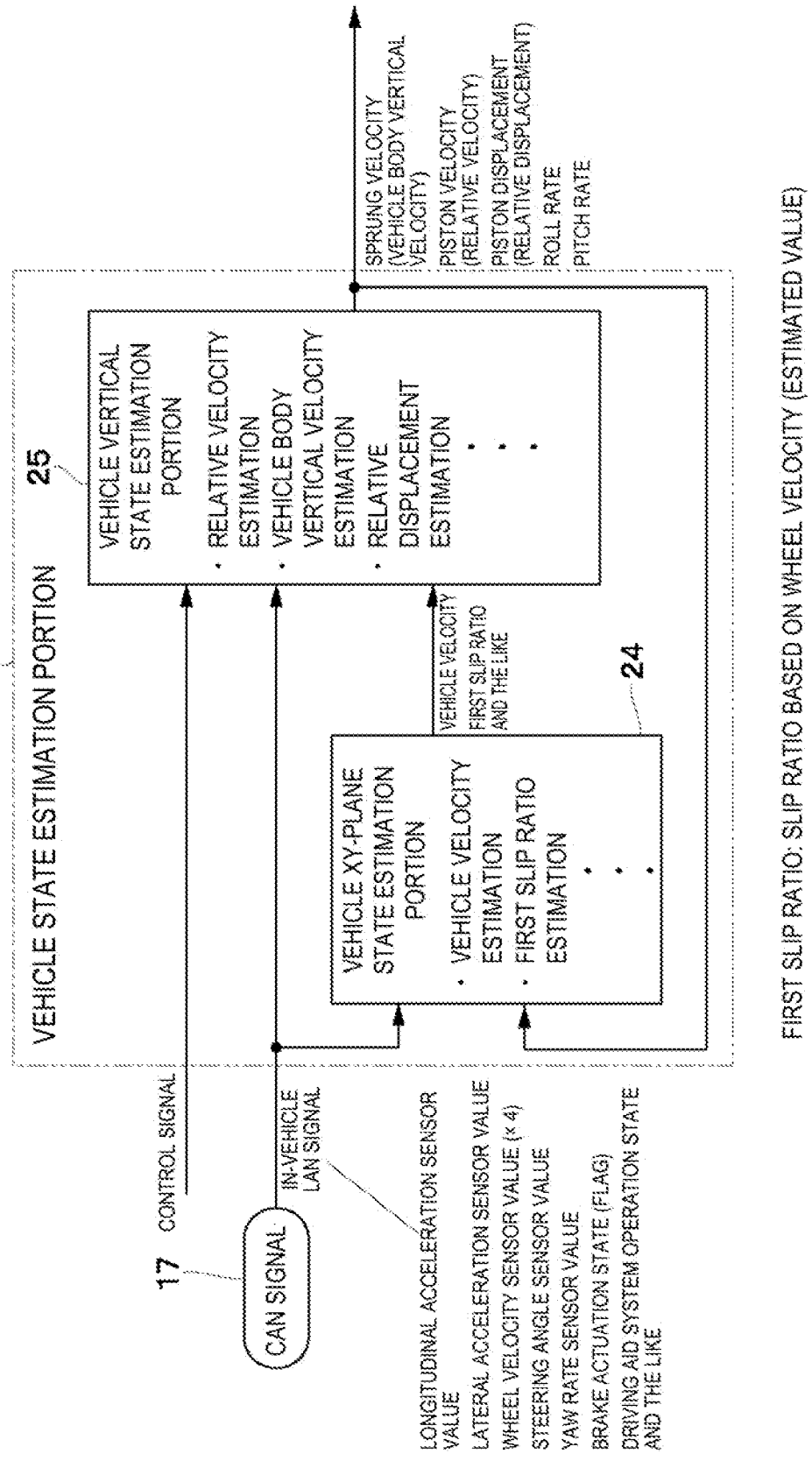

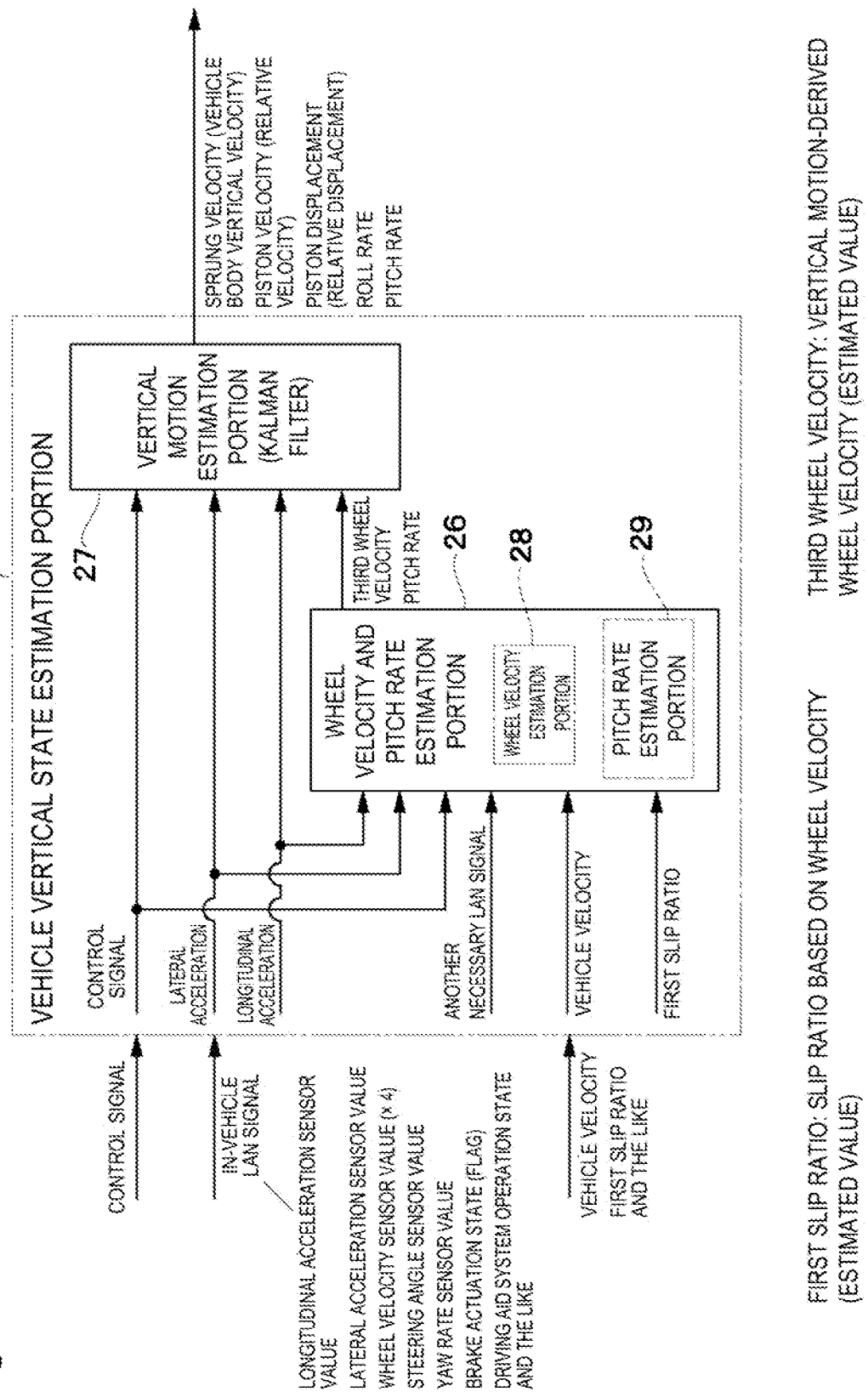

Fig. 5

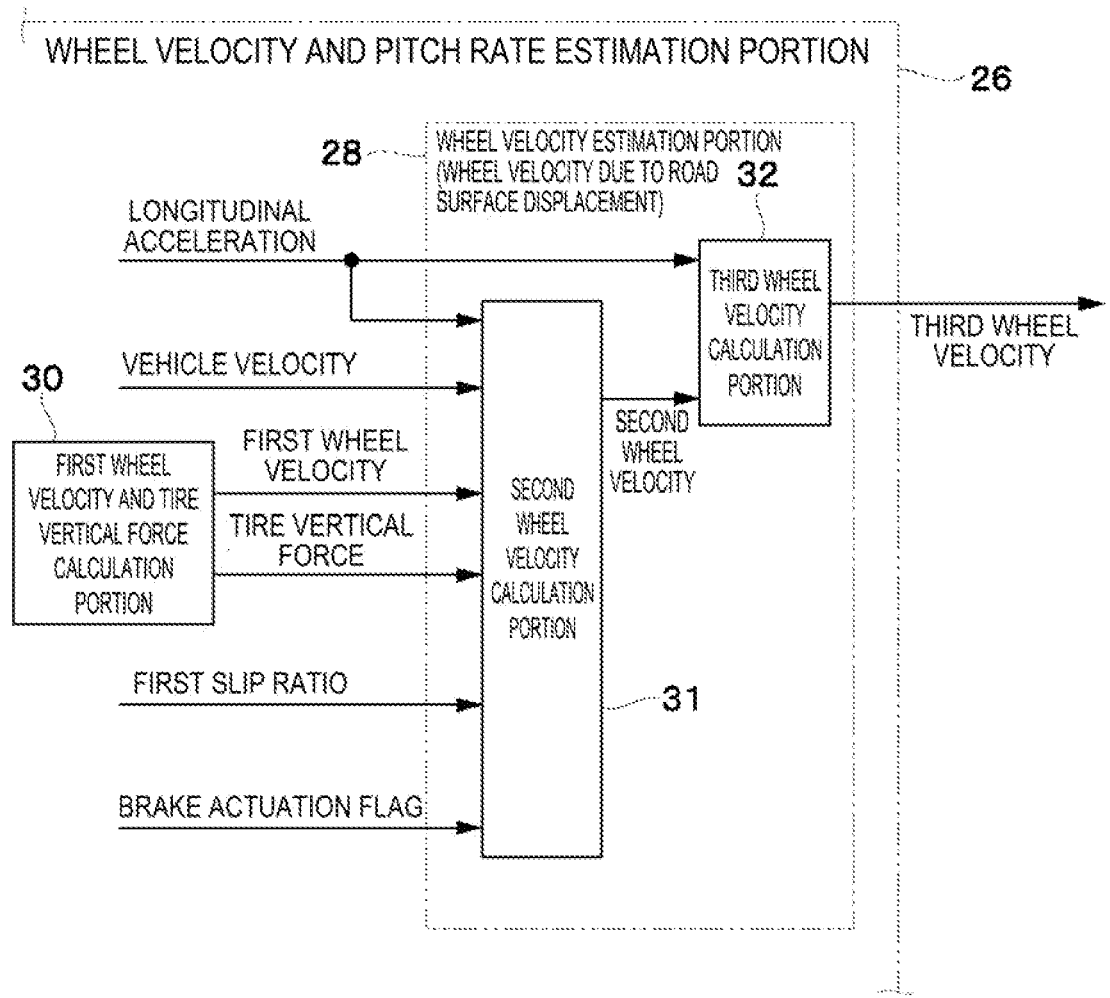

FIRST WHEEL VELOCITY CALCULATION PORTION: PORTION THAT CALCULATES WHEEL VELOCITY NOT CONTAINING DRIVER'S OPERATION-BASED VERTICAL MOTION-DERIVED WHEEL VELOCITY

TIRE VERTICAL FORCE CALCULATION PORTION: DRIVER'S OPERATION-DERIVED TIRE VERTICAL FORCE CALCULATION PORTION

FIRST WHEEL VELOCITY: WHEEL VELOCITY NOT CONTAINING DRIVER'S OPERATION-BASED VERTICAL MOTION-DERIVED WHEEL VELOCITY (ESTIMATED VALUE)

TIRE VERTICAL FORCE: DRIVER'S OPERATION-DERIVED TIRE VERTICAL FORCE (ESTIMATED VALUE)

FIRST SLIP RATIO: SLIP RATIO BASED ON WHEEL VELOCITY (ESTIMATED VALUE)

SECOND WHEEL VELOCITY CALCULATION PORTION: WHEEL SLIP-CONSIDERED WHEEL VELOCITY CALCULATION PORTION

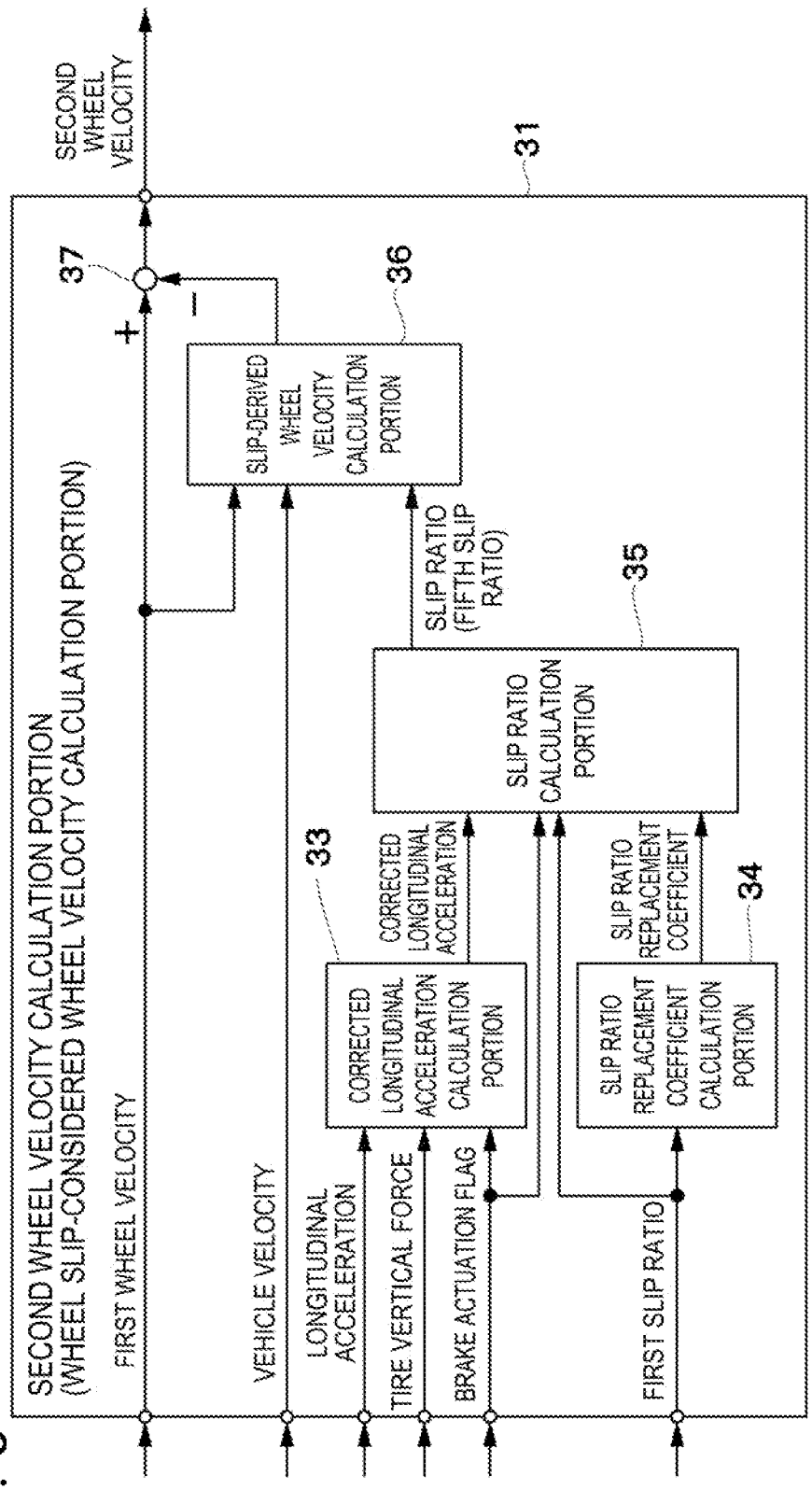

SLIP STATE DETECTION APPARATUS AND SUSPENSION CONTROL APPARATUS

CROSS-REFERENCE TO RELATED APPLICATION

The present application claims priority under the Paris Convention to Japanese Patent Application No. 2021-011007 filed on Jan. 27, 2021. The entire disclosure of Japanese Patent Application No. 2021-011007 including the specification, the claims, the drawings, and the abstract is incorporated herein by reference in its entirety.

TECHNICAL FIELD

The present disclosure relates to a slip state detection apparatus and a suspension control apparatus mounted on a vehicle, such as an automobile.

BACKGROUND ART

Japanese Patent Application No. 2003-306093 discusses a tire state determining apparatus that detects an acceleration/deceleration of a vehicle body and a rotational velocity of a wheel and determines a state of a tire in consideration of a tire torsional spring element and a suspension longitudinal spring element. Japanese Patent Application No. 2015-051719 discusses a suspension control apparatus that determines a slip ratio change amount of a wheel and corrects a gain of a wheel velocity change amount.

SUMMARY OF INVENTION

Technical Problem

Then, in a case where a state of the vehicle body in the vertical direction (for example, a stroke of a suspension or a vertical acceleration) is estimated based on a change in the wheel velocity such as a detection value of a wheel velocity sensor, occurrence of even a slight slip may lead to a reduction in the estimation accuracy.

Solution to Problem

One object of one embodiment of the present invention is to provide a slip state detection apparatus and a suspension control apparatus capable of improving the accuracy of estimating a slip ratio and thus a state of a vehicle body in the vertical direction.

According to one aspect of the present invention, a slip state detection apparatus includes a tire characteristic-considered slip ratio determination portion configured to determine a tire characteristic-considered slip ratio according to a longitudinal acceleration of a vehicle detected by a longitudinal acceleration detection portion and a tire characteristic, and a corrected slip ratio determination portion configured to determine a corrected slip ratio of each wheel by correcting the tire characteristic-considered slip ratio according to a slip ratio of each wheel determined according to a rotational velocity signal of each wheel.

Further, according to one aspect of the present invention, a suspension control apparatus includes a longitudinal acceleration detection portion configured to detect a longitudinal acceleration of a vehicle and output a longitudinal acceleration signal, a wheel rotational velocity detection portion configured to detect a rotational velocity of each wheel and output a rotational velocity signal of each wheel, a control device configured to input the longitudinal acceleration signal and the rotational velocity signal of each wheel, determine a tire characteristic-considered slip ratio based on the input longitudinal acceleration signal and a tire characteristic, determine a corrected slip ratio of each wheel by correcting the tire characteristic-considered slip ratio according to the rotational velocity signal of each wheel, estimate a vertical motion of a vehicle body based on the rotational velocity signal of each wheel, correct the estimated vertical motion of the vehicle body based on the corrected slip ratio of each wheel, and output a control signal based on the corrected vertical motion of the vehicle body, and an actuator provided between the vehicle body and a wheel-side member and configured to change a state of the vehicle body in reaction to an input from the wheel-side member according to the control signal.

According to the one aspect of the present invention, the accuracy of estimating the slip ratio and thus the state of the vehicle body in the vertical direction can be improved.

BRIEF DESCRIPTION OF DRAWINGS

FIG. 3 is a block diagram illustrating a vehicle state estimation portion illustrated in FIG. 2.

FIG. 4 is a block diagram illustrating a vehicle vertical state estimation portion illustrated in FIG. 3.

FIG. 5 is a block diagram illustrating a wheel velocity estimation portion illustrated in FIG. 4.

FIG. 6 is a block diagram illustrating a second wheel velocity calculation portion illustrated in FIG. 5.

DESCRIPTION OF EMBODIMENTS

In the following description, a slip state detection apparatus and a suspension control apparatus according to an embodiment will be described citing an example in which they are used in an automobile (more specifically, a four-wheeled automobile) as a vehicle with reference to the accompanying drawings.

Figure 1:
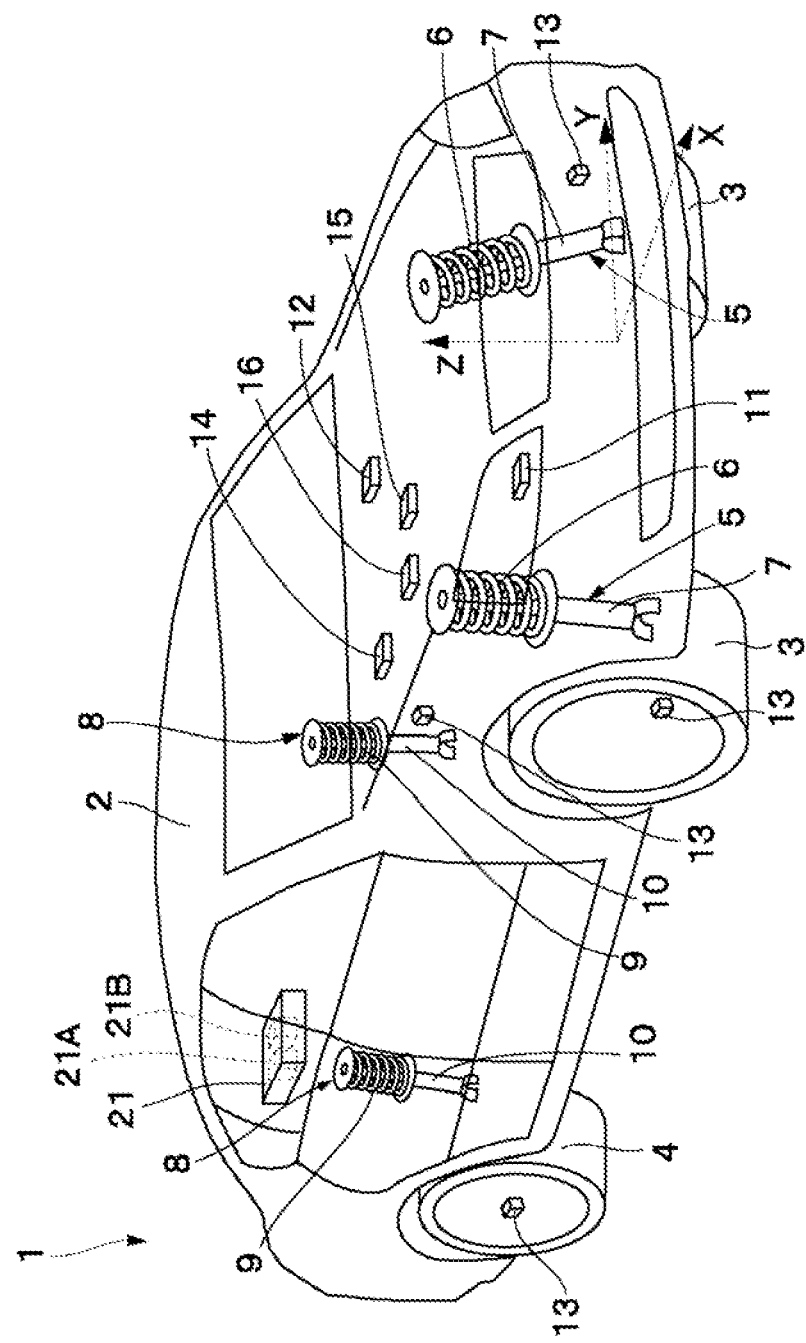
FIG. 1 is an overall configuration diagram illustrating a four-wheeled automobile on which a slip state detection apparatus and a suspension control apparatus according to an embodiment are mounted.

In FIG. 1, for example, four wheels 3 and 4 in total, which include left and right front wheels 3 and left and right rear wheels 4 (only one front wheel 3 and one rear wheel 4 are illustrated), are disposed under a vehicle body 2 forming a main structure of a vehicle 1, which is an automobile. Front wheel-side suspensions 5 and 5 (hereinafter referred to as front wheel suspensions 5) are disposed so as to be interposed between the left and right front wheels 3 and the vehicle body 2, respectively. The front-wheel suspensions 5 each include a suspension spring 6 (hereinafter referred to as a spring 6) and a damping force adjustable shock absorber 7 (hereinafter referred to as a shock absorber 7) arranged in parallel with the spring 6.

Rear wheel-side suspensions 8 and 8 (hereinafter referred to as rear wheel suspensions 8) are disposed so as to be interposed between the left and right rear wheels 4 and the vehicle body 2, respectively. The rear wheel suspensions 8 each include a suspension spring 9 (hereinafter referred to as a spring 9) and a damping force adjustable shock absorber 10 (hereinafter referred to as a shock absorber 10) arranged in parallel with the spring 9. The shock absorbers 7 and 10 are each constituted by, for example, a semi-active damper workable as a hydraulic cylinder apparatus capable of adjusting a damping force (a damping force variable shock absorber). In other words, a semi-active suspension system using the damping force variable shock absorber is mounted on the vehicle 1.

Now, the shock absorbers 7 and 10 are damping force variable damping force generation apparatuses (damping force variable shock absorbers) provided between the vehicle body 2 of the vehicle 1 and the wheels 3 and 4 (more specifically, wheel-side members supporting the wheels 3 and 4). The shock absorbers 7 and 10 correspond to a vehicle body posture control apparatus that controls the posture of the vehicle 1. In other words, the characteristics of damping forces generated by the shock absorbers 7 and 10 (damping force characteristics) are variably controlled by a suspension control unit 21, which will be described below. To achieve that, the shock absorbers 7 and 10 are each equipped with a damping force adjustment actuator (not illustrated) constituted by a damping force adjustment valve and a solenoid or the like to adjust the damping force characteristic from a hard characteristic (a high characteristic) to a soft characteristic (a low characteristic) continuously (or in a multi-step manner). The damping force characteristic of each of the shock absorbers 7 and 10 is variably adjusted according to an instruction current (a control signal or a control instruction) supplied from the suspension control unit 21 to the damping force adjustment actuator.

A conventionally known structure, such as a pressure control method that controls a pilot pressure of a damping force generation valve or a flow rate control method that controls a passage area, can be used as the damping force adjustment valve. Alternatively, each of the shock absorbers 7 and 10 is not limited to the above-described example as long as it can adjust the damping force continuously (or in a multi-step manner), and may be, for example, a pneumatic damper, an electromagnetic damper, an electrorheological fluid damper, or a magnetic fluid damper. Alternatively, each of the shock absorbers 7 and 10 may be, for example, an air damper (an air suspension) using an air spring (a pneumatic spring), a hydraulic damper in which front left and right, and rear left and right hydraulic cylinders are connected via pipes (a vehicle height adjustment apparatus), or a stabilizer that provides a force to motions of left and right wheels. Alternatively, each of the shock absorbers 7 and 10 may be a full-active damper realized by a hydraulic actuator, an electric actuator, or an atmospheric actuator capable of generating a thrust force. In other words, a full-active suspension system using a full-active damper may be mounted on the vehicle 1.

Next, various kinds of sensors 11, 12, 13, 14, and 15 that detect a state of the vehicle 1, and a switch 16 will be described.

As illustrated in FIG. 1, the vehicle 1 includes a longitudinal acceleration sensor 11, a lateral acceleration sensor 12, wheel velocity sensors 13, a steering angle sensor 14, a yaw rate sensor 15, and a brake switch 16. These sensors 11, 12, 13, 14, and 15 and switch 16 are each a sensor or a switch generally mounted on the vehicle 1, more specifically, a sensor or a switch mainly used to control braking, driving, or steering of the vehicle 1.

Figure 2:
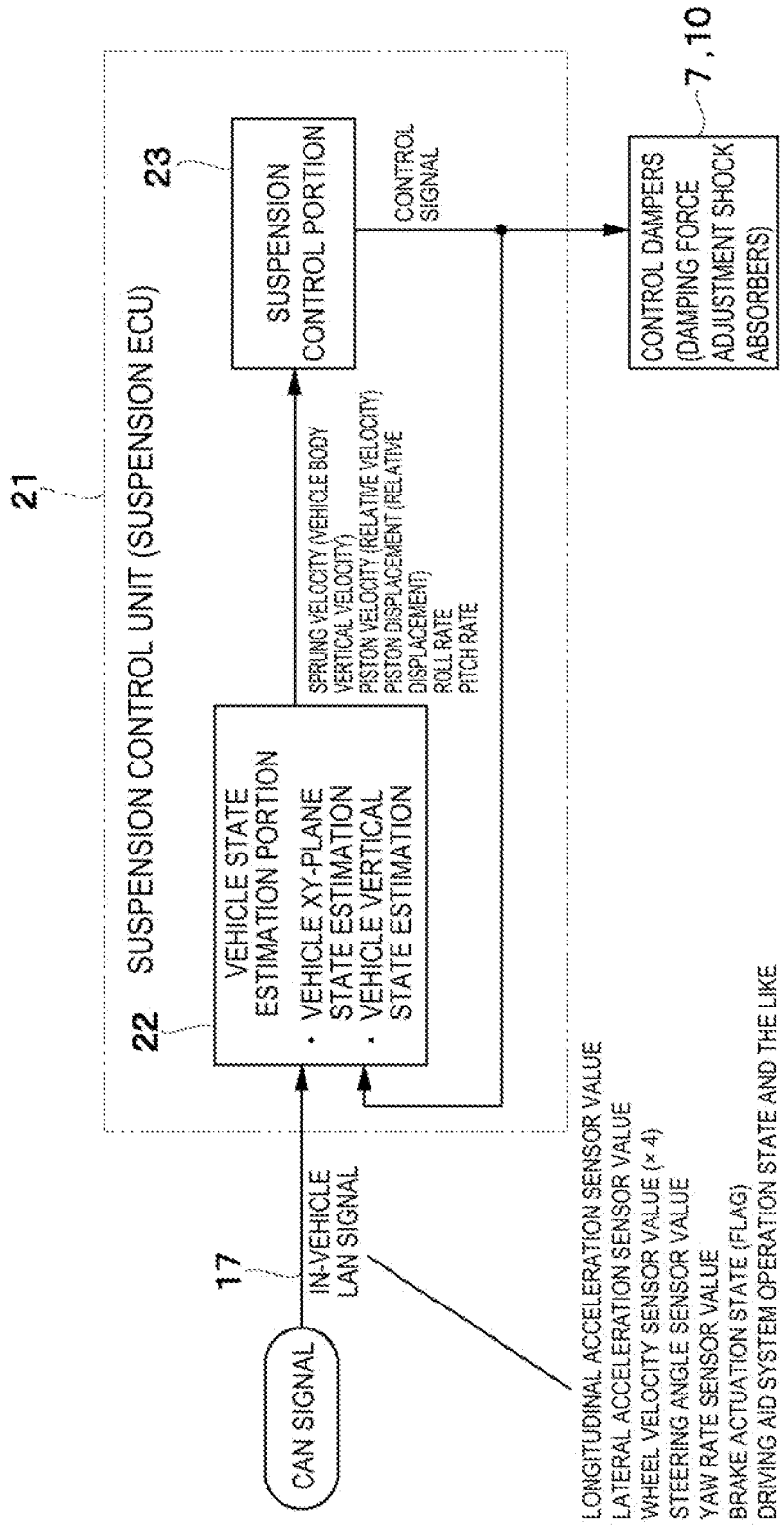
FIG. 2 is a block diagram illustrating a controller (an ECU), damping force variable shock absorbers (control dampers), and the like illustrated in FIG. 1.

The longitudinal acceleration sensor 11 as a longitudinal acceleration detection unit is disposed on, for example, the vehicle body 2 located on a sprung side of the vehicle 1. The longitudinal acceleration sensor 11 detects an acceleration (a deceleration and an acceleration) of the vehicle 1 (the vehicle body 2) in the longitudinal direction. Detection information of the longitudinal acceleration sensor 11 (a signal corresponding to the longitudinal acceleration) is, for example, output to various kinds of controllers (ECUs) mounted on the vehicle 1 via a CAN 17 that is in-vehicle LAN communication (FIG. 2, which will be described below). For example, the information of the longitudinal acceleration sensor 11 (the longitudinal acceleration) is output to a controller (a braking and driving ECU, or a braking ECU and a driving ECU) of a braking and driving system (a braking system and a driving system) of the vehicle 1, a controller (a steering ECU) of a steering system of the vehicle 1, and the like via the CAN 17, although this is not illustrated. Further, the information of the longitudinal acceleration sensor 11 (a longitudinal acceleration sensor value) is output to the suspension control unit 21 (a suspension ECU) serving as a controller of a suspension system of the vehicle 1 via the CAN 17 as illustrated in FIG. 2, which will be described below.

The lateral acceleration sensor 12 is disposed on, for example, the vehicle body 2 located on the sprung side of the vehicle 1. The lateral acceleration sensor 12 detects an acceleration of the vehicle 1 (the vehicle body 2) in the lateral direction (a lateral acceleration or a sideways acceleration). Detection information of the lateral acceleration sensor 12 (a signal corresponding to the lateral acceleration) is, for example, output to various kinds of controllers (ECUs) via the CAN 17. For example, the information of the lateral acceleration sensor 12 (a lateral acceleration sensor value) is output to the suspension control unit 21 (the suspension ECU) via the CAN 17 as illustrated in FIG. 2, which will be described below.

Each of the wheel velocity sensors 13 as a wheel rotational velocity detection unit is disposed on, for example, a wheel support hub unit that supports the wheel 3 or 4. The wheel velocity sensor 13 is provided in correspondence with each of the wheels 3 and 4. The wheel velocity sensor 13 detects a rotational velocity of the wheel 3 or 4 (a wheel velocity). Detection information of the wheel velocity sensor 13 (a signal corresponding to the wheel velocity) is, for example, output to various kinds of controllers (ECUs) via the CAN 17. For example, the information of the wheel velocity sensor 13 (a wheel velocity sensor value×4) is output to the suspension control unit 21 (the suspension ECU) via the CAN 17 as illustrated in FIG. 2, which will be described below.

The steering angle sensor 14 is disposed on, for example, a steering apparatus (not illustrated) of the vehicle 1. The steering angle sensor 14 detects a steering angle (a rotational angle) or a steered angle of the wheel (the front wheel 3) generated by a steering operation of a driver driving the vehicle 1. Detection information of the steering angle sensor 14 (a signal corresponding to the steering angle) is, for example, output to various kinds of controllers (ECUs) via the CAN 17. For example, the information of the steering angle sensor 14 (a steering angle sensor value) is output to the suspension control unit 21 (the suspension ECU) via the CAN 17 as illustrated in FIG. 2, which will be described below.

The yaw rate sensor 15 is disposed on, for example, the vehicle body 2 located on the sprung side of the vehicle 1. The yaw rate sensor 15 detects a yaw rate (a vehicle body yaw rate), which is a rotational angular velocity around a yaw axis (a vertical axis) extending in the vertical direction of the vehicle 1 (the vehicle body 2). Detection information of the yaw rate sensor 15 (a signal corresponding to the yaw rate) is, for example, output to various kinds of controllers (ECUs) via the CAN 17. For example, the information of the yaw rate sensor 15 (a yaw rate sensor value) is output to the suspension control unit 21 (the suspension ECU) via the CAN 17 as illustrated in FIG. 2, which will be described below.

The brake switch 16 is disposed on, for example, a brake pedal (not illustrated). The brake switch 16 detects whether the brake pedal is operated. For example, the brake switch 16 outputs an ON signal corresponding to a brake actuation flag when the brake pedal is operated (pressed down). Detection information of the brake switch 16 (the ON signal corresponding to the presence of a brake operation) is, for example, output to various kinds of controllers (ECUs) via the CAN 17. For example, the ON signal of the brake switch 16 (the brake actuation flag corresponding to a brake actuation state) is output to the suspension control unit 21 (the suspension ECU) via the CAN 17 as illustrated in FIG. 2, which will be described below.

Next, the suspension control unit 21, which controls the shock absorbers 7 and 10, will be described.

The suspension control unit 21 as a control device includes a microcomputer, a power source circuit, and a driving circuit, and is also called an ECU (Electronic Control Unit). The suspension control unit 21 is the controller (the control device) for the suspension system, i.e., the suspension ECU (a shock absorber ECU). The suspension control unit 21 controls the shock absorbers 7 and 10 (adjusts the damping forces thereof) based on the information detected by the sensors 11, 12, 13, 14, and 15, the switch 16, and the like, i.e., sensor information, switch information, and the like. In this case, the suspension control unit 21 estimates the state of the vehicle 1 based on the sensor information and the switch information, and controls the shock absorbers 7 and 10 according to the estimated state of the vehicle 1.

As illustrated in FIG. 2, the suspension control unit 21 is connected to the CAN 17. Due to that, the signal of the longitudinal acceleration sensor 11 (the longitudinal acceleration sensor value), the signal of the lateral acceleration sensor 12 (the lateral acceleration sensor value), the signal of the wheel velocity sensor 13 (the wheel velocity sensor value×4), the signal of the steering angle sensor 14 (the steering angle sensor value), the signal of the yaw rate sensor 15 (the yaw rate sensor value), and the signal of the brake switch 16 (the brake actuation flag corresponding to the brake actuation state) are input to the suspension control unit 21 via the CAN 17 as CAN signals. Further, a signal corresponding to a driving aid system operation state (a brake actuation flag corresponding to a state in which a system regarding braking, such as ABS, TCS, or VSC, is performing a brake operation) is input to the suspension control unit 21 as a CAN signal. On the other hand, the output side of the suspension control unit 21 is connected to the shock absorbers 7 and 10, which are control dampers. The suspension control unit 21 outputs a control signal (an instruction current or a control instruction) to the damping force adjustment actuator of each of the shock absorbers 7 and 10 (for example, a solenoid that adjusts the valve-opening pressure of the damping force adjustment valve).

As illustrated in FIG. 1, the suspension control unit 21 includes a control portion 21A, which performs arithmetic processing, such as a CPU (an arithmetic processing unit), and a storage portion 21B, which is constituted by a memory such as a ROM, a RAM, or a nonvolatile memory. The storage portion 21B stores therein, for example, a processing program that calculates (estimates) the vehicle state (the vehicle motion or the vehicle behavior) based on the information (the input signals) of the sensors 11, 12, 13, 14, and 15, the switch 16, and the like, a processing program that calculates the damping force that should be generated by each of the shock absorbers 7 and 10 based on the state of the vehicle (the vehicle motion or the vehicle behavior), and a processing program that outputs the control signal (the control instruction) corresponding to the damping force that should be generated.

For example, the skyhook control law, the BLQ control law (the bilinear optimal control law), or the H∞ control law can be used as a control law that calculates the damping forces of the shock absorbers 7 and 10 (a control law for ride comfort and a control law for driving stability). The suspension control unit 21, for example, increases the damping forces of the shock absorbers 7 and 10 when decelerating the motion (the behavior) of the vehicle body 2 located on the sprung side with the aid of the damping forces of the shock absorbers 7 and 10, and suppresses the damping forces of the shock absorbers 7 and 10 when accelerating the motion (the behavior) of the vehicle body 2 located on the sprung side with the aid of the damping forces of the shock absorbers 7 and 10. The shock absorbers 7 and 10, which are damping force variable dampers, work to change the damping forces thereof to appropriately damp a vertical motion of each of the wheels 3 and 4, thereby suppressing the vibration of the vehicle body 2.

Then, the suspension control apparatus discussed in the above-described patent literature, PTL 2 calculates a relative displacement velocity between the sprung side (the vehicle body side) and the unsprung side (the wheel side) from the change amount of the velocity of the wheel (the wheel velocity) and controls the damping force of the damping force variable damper based on the calculated relative displacement velocity. In this case, the suspension control apparatus in PTL 2 removes a wheel velocity change amount due to a change in the slip ratio of the wheel by changing the gain by which the wheel velocity change amount is multiplied using a driving torque or the like.

In the case where the relative displacement velocity is calculated from the wheel velocity in this manner, i.e., the vertical motion of the vehicle (the vehicle body) is estimated (calculated) based on the wheel velocity, a wheel velocity due to the vertical motion of the vehicle (the vehicle body) (a vertical motion-derived wheel velocity) is extracted from the wheel velocity detected by the wheel velocity sensor (the wheel velocity sensor signal). In this case, the vertical motion-derived wheel velocity can be calculated by, for example, subtracting a "wheel velocity due to braking/ driving (braking or driving) of the vehicle (a braking/driving wheel velocity)" and a "wheel velocity due to a slip of the wheel (a wheel slip-derived wheel velocity)" from the "wheel velocity sensor signal".

Now, when the vehicle runs straight at a constant velocity, the slip ratio of the wheel (the tire) is slight. Therefore, the vertical motion-derived wheel velocity is considered to be calculated without consideration of the wheel slip-derived wheel velocity. In other words, the vertical motion-derived wheel velocity is considered to be calculated by subtracting the "wheel velocity due to braking/driving (braking or driving) of the vehicle (the braking/driving wheel velocity)" from the "wheel velocity sensor signal". More specifically, assuming that "Vwz" represents the vertical motion-derived wheel velocity, "Vwse" represents the wheel velocity according to the wheel velocity sensor signal, and "Gx" represents a longitudinal acceleration corresponding to the braking/driving wheel velocity (braking or driving wheel velocity), the vertical motion-derived wheel velocity Vwz is considered to be calculated according to the following equation 1.

$$Vwz = \int (\dot{V}wse - Gx) dt \qquad \text{[Equation 1]}$$

However, when the wheel slip-derived wheel velocity is high, an estimation error of the vertical motion-derived wheel velocity increases and the vertical motion state amount may be dispersed. Therefore, one conceivable method to prevent that is to estimate the vertical motion-derived wheel velocity, for example, using a wheel velocity on the opposite left or right side if a slip equal to or more than a threshold value occurs on a wheel velocity of one wheel, or using the vehicle body velocity (the vehicle velocity) if a slip equal to or more than the threshold value occurs on each of both the left and right wheels. However, in this case, since a slip is not taken into consideration, the accuracy of estimating the vertical motion-derived wheel velocity may reduce along with a slip that occurs due to acceleration/deceleration. Further, when a slight slip occurs, for example, the estimation accuracy may reduce on a road surface where there is a difference in input between the left side and the right side because of the use of the wheel velocity of the opposite left or right wheel. Further, in the case where the vehicle body velocity is used, a component due to a vertical motion is not contained in the vehicle body velocity, which may make it difficult to estimate the vertical motion of the vehicle body.

In light thereof, in the embodiment, the slip ratio is calculated from a tire characteristic (for example, a known tire characteristic acquired from a tire characteristic test in advance) and the vehicle body longitudinal acceleration. In this case, the same result (the same value) is acquired as the slip ratio of each tire (each wheel) because of the use of the longitudinal acceleration of the vehicle body. Therefore, in the embodiment, the percentage of the slip of each wheel is calculated based on the slip ratio of each wheel calculated from the wheel velocity. Then, the slip ratio of each wheel is calculated (corrected) by distributing the "slip ratio of each wheel calculated from the vehicle longitudinal acceleration (the same value)" according to the "percentage of the slip of each wheel calculated from the wheel velocity". In the embodiment, the wheel slip-derived wheel velocity of each wheel is determined using the slip ratio of each wheel calculated in this manner. Therefore, the wheel slip-derived wheel velocity can be accurately determined.

Then, in the embodiment, the wheel slip-derived wheel velocity, which constitutes an unnecessary component, is subtracted (removed) from the wheel velocity detected by the wheel velocity sensor (the wheel velocity sensor signal) using the wheel slip-derived wheel velocity determined in this manner. In other words, when the vertical motion-derived wheel velocity is extracted from the wheel velocity detected by the wheel velocity sensor (the wheel velocity sensor signal), the wheel slip-derived wheel velocity acquired in the above-described manner is subtracted (removed) from the wheel velocity detected by the wheel velocity sensor (the wheel velocity sensor signal). Therefore, the accuracy of estimating the vertical motion-derived wheel velocity can be improved.

Further, in the embodiment, the slip ratio of each wheel calculated in the above-described manner is used when the slip is slight (at the time of a slight slip). For example, when the slip ratio has a low value such as 0.02 or lower, the slip ratio of each wheel calculated in the above-described manner, i.e., the slip ratio of each wheel acquired by correcting the slip ratio determined based on the vehicle body longitudinal acceleration and the tire characteristic (distributing the slip ratio to each wheel) (hereinafter also referred to as a "slip ratio based on the longitudinal acceleration") is used. On the other hand, at the time of an intermediate slip greater than the slight slip, such as when the slip ratio is 0.02 or higher and 0.08 or lower, the slip ratio is switched from the slip ratio based on the longitudinal acceleration to the slip ratio calculated based on the wheel velocity and the vehicle body velocity (hereinafter also referred to as a "slip ratio based on the wheel velocity") according to the slip at that time. More specifically, a slip ratio switching coefficient is calculated using the slip ratio based on the wheel velocity as an input, and the slip ratio based on the longitudinal acceleration is gradually replaced with the slip ratio based on the wheel velocity using this calculated slip ratio switching coefficient.

A slip ratio serving as an upper limit of the slight slip (=a lower limit of the intermediate slip) (for example, 0.02) can be set according to the tire characteristic. For example, the upper limit of the slight slip can be set based on a slip ratio in a range where the tire characteristic is linear as will be described below. Further, a slip ratio serving as an upper limit of the intermediate slip (for example, 0.08) can be set based on a slip ratio at which the driving aid system such as a traction control system starts to be actuated. Further, the range of the slight slip and the range of the intermediate slip (i.e., the slip ratios "0.02" and "0.08") are merely examples, and these values vary according to the type and the specifications of the vehicle 1, the type and the specifications of the tire, and the like. In other words, the tire characteristic for determining the slip ratio is set for each type and each specification of the vehicle 1, and each type and each specification of the tire.

The suspension control unit 21 makes a calculation (an estimation) of the vehicle state (the vehicle motion or the vehicle behavior) including the calculation (the estimation) of the slip ratio and the calculation (the estimation) of the wheel slip-derived wheel velocity, and also controls the shock absorbers 7 and 10 based on the calculated (estimated) vehicle state (the vehicle motion or the vehicle behavior). In the following description, this suspension control unit 21 will be described with additional reference to FIGS. 2 to 12 along with FIG. 1.

The suspension system according to the embodiment includes the shock absorbers 7 and 10, the suspension control unit 21, which outputs the control signal (the control instruction) to each of the shock absorbers 7 and 10, and the longitudinal acceleration sensor 11 and the wheel velocity sensors 13, which constitute sensors mounted on the vehicle 1. The suspension system estimates the state of the vehicle 1 (more specifically, a sprung velocity, a piston velocity, a piston displacement, a roll rate, and a pitch rate) based on the longitudinal acceleration information of the longitudinal acceleration sensor 11, the wheel velocity information of the wheel velocity sensors 13, and the like, and controls the damping forces of the shock absorbers 7 and 10 according to the estimated state of the vehicle 1.

The suspension control unit 21 (the control portion 21A) estimates the state of the vehicle 1 based on the sensor values of the sensors such as the longitudinal acceleration sensor 11 and the wheel velocity sensors 13 mounted on the vehicle 1, and outputs the control signal (the control instruction) to each of the shock absorbers 7 and 10 according to the estimated state of the vehicle 1. To fulfill this function, the vehicle 1 includes the longitudinal acceleration sensor 11, the lateral acceleration sensor 12, the wheel velocity sensors 13, the steering angle sensor 14, the yaw rate sensor 15, and the brake switch 16, as illustrated in FIG. 1. As illustrated in FIG. 2, the signal corresponding to the longitudinal acceleration sensor value, the signal corresponding to the lateral acceleration sensor value, the signal corresponding to the wheel velocity sensor value (×4), the signal corresponding to the steering angle sensor value, the signal corresponding to the yaw rate sensor value, the signal corresponding to the brake actuation state, and the signal corresponding to the driving aid system operation state are input to the suspension control unit 21 via the CAN 17.

As illustrated in FIG. 2, the suspension control unit 21 includes a vehicle state estimation portion 22 (a vehicle body state estimation portion) and a suspension control portion 23 (a control signal output portion). The vehicle state estimation portion 22 estimates the vehicle state (the vehicle body state) based on the input signals input via the CAN 17. More specifically, the vehicle state estimation portion 22 calculates (estimates) the vehicle state such as the sprung velocity (a vehicle body vertical velocity), the piston velocity (a relative velocity), the piston displacement (a relative displacement), the roll rate (a vehicle body roll rate), and the pitch rate (a vehicle body pitch rate) based on the input signals corresponding to the longitudinal acceleration, the lateral acceleration, the wheel velocity (×4), the steering angle, the pitch rate, and the like. The sprung velocity corresponds to, for example, a vertical velocity of the vehicle body 2 at each of the positions of the wheels 3 and 4. The piston velocity corresponds to a velocity (a compression/extension velocity or a relative velocity) of the piston of each of the shock absorbers 7 and 10. The piston displacement corresponds to a displacement amount (a compression/extension amount) of the piston of each of the shock absorbers 7 and 10. The vehicle state estimation portion 22 outputs the estimated vehicle state (the sprung velocity, the piston velocity, the piston displacement, the roll rate, the pitch rate, and the like) to the suspension control portion 23.

The sprung velocity, the piston velocity, the piston displacement, the roll rate, and the pitch rate are input from the vehicle state estimation portion 22 (a vehicle vertical state estimation portion 25, more specifically, a vertical motion estimation portion 27) to the suspension control portion 23. Further, the vehicle body velocity, the wheel velocity, the longitudinal acceleration, the lateral acceleration, the steering angle, and the like are input to the suspension control portion 23 as necessary, although they are not illustrated. The suspension control portion 23, which is a control logic portion, calculates the damping force that should be generated by each of the shock absorbers 7 and 10 based on these inputs and the control law. In other words, the suspension control portion 23 calculates the damping force that should be generated by each of the shock absorbers 7 and 10 according to the sprung velocity, the piston velocity, the piston displacement, the roll rate, the pitch rate, the vehicle body velocity, the wheel velocity, the longitudinal acceleration, the lateral acceleration, and the steering angle, which constitute the vehicle state. The suspension control portion 23 outputs the control signal (the control instruction or the instruction current) according to the damping force that should be generated by each of the shock absorbers 7 and 10 to each of the shock absorbers 7 and 10 serving as the control dampers. In other words, the suspension control portion 23 outputs the control signal (the control instruction or the instruction current) corresponding to a damper instruction value that allows the vehicle 1 to be appropriately controlled to the damping force adjustment actuator of each of the shock absorbers 7 and 10 (for example, the solenoid that adjusts the valve-opening pressure of the damping force adjustment valve). Further, the control signal of the suspension control portion 23 (a damper control current value) is input to the vehicle state estimation portion 22.

In this manner, the semi-active suspension system according to the embodiment includes the CAN 17, the suspension control unit 21, and the shock absorbers 7 and 10 that are semi-active suspensions. The suspension control unit 21 can acquire a detection signal of an in-vehicle sensor such as the wheel velocity of each of the wheels 3 and 4 and the longitudinal acceleration of the vehicle body 2 from the CAN 17. The suspension control unit 21 includes the vehicle state estimation portion 22 and the suspension control portion 23. The vehicle state estimation portion 22 estimates the vehicle motion state amount such as the relative velocity and the sprung vertical velocity required to control the shock absorbers 7 and 10 based on the information acquired from the CAN 17. The suspension control portion 23 functions as the semi-active control logic that controls the shock absorbers 7 and 10 based on the vehicle motion state amount estimated by the vehicle state estimation portion 22. The damping force of each of the shock absorbers 7 and 10 is controlled based on the control instruction value (the control instruction) from the suspension control portion 23.

The vehicle state estimation portion 22 is a three-dimensional vehicle motion state estimation algorithm (i.e., an algorithm for estimating a three-dimensional vehicle motion state) integrally including the vehicle vertical state estimation portion 25 as a VSE algorithm for estimating the vertical motion state such as the relative velocity (a vertical direction VSE algorithm) and a vehicle XY-plane state estimation portion 24 as a VSE algorithm for estimating a planer motion state such as a sideslip angle (a planar direction VSE algorithm), as illustrated in FIG. 3, which will be described below. Then, the vehicle vertical state estimation portion 25 includes a wheel velocity and pitch rate estimation portion 26 and the vertical motion estimation portion 27 as illustrated in FIG. 4, which will be described below. The wheel velocity and pitch rate estimation portion 26 estimates the vertical motion-derived wheel velocity (a third wheel velocity), which is a wheel velocity generated due to a vertical motion of the vehicle 1, the pitch rate, and the like, with use of the wheel velocity, the longitudinal acceleration, and the like acquired from the CAN 17 and the sideslip angle and the like estimated by the vehicle XY-plane state estimation portion 24 as inputs.

The vertical motion estimation portion 27 estimates the vertical motion state amount such as the relative velocity and the sprung vertical velocity using the vertical motion-derived wheel velocity (the third wheel velocity) and the pitch rate as an observed value y, and the longitudinal acceleration and the like as an input value u. Now, the vertical motion estimation portion 27 uses a linear Kalman filter for the purpose of reducing a calculation load, and divides the suspension damping force and the vertical motion-derived wheel velocity into a linearizable stationary component and a non-linearizable non-stationary component. Then, the non-stationary component is estimated in the vertical motion estimation portion 27 using an output of the vertical motion estimation portion 27 in the last calculation cycle (a previous value), the control instruction value and the wheel velocity acquired from the suspension control portion 23, and a wheel velocity due to a planar motion of the vehicle 1 that is estimated by the pitch rate estimation portion 26 as inputs, and is used as the input value u to estimate the vertical motion state amount.

The vehicle state estimation portion 22, which estimates (calculates) the vehicle motion state in this manner, will be described with additional reference to FIG. 3 along with FIG. 2.

The longitudinal acceleration sensor value, the lateral acceleration sensor value, the wheel velocity sensor value (×4), the steering angle sensor value, the yaw rate sensor value, the brake actuation state, the driving aid system operation state, and the like are input to the vehicle state estimation portion 22 via the CAN 17. Further, the control signal (the control instruction) fed from the suspension control portion 23 is input to the vehicle state estimation portion 22. The vehicle state estimation portion 22 estimates (calculates) a state of the vehicle 1 in an XY planar direction and also estimates (calculates) a state of the vehicle 1 in the vertical direction (a Z direction) based on these inputs. The X direction, the Y direction, and the Z direction are a coordinate system of the vehicle 1 (a vehicle coordinate system) (FIG. 1).

In other words, the vehicle state estimation portion 22 estimates a state value of the vehicle 1 regarding the XY planar direction, such as the vehicle velocity and a first slip ratio, as the state of the vehicle 1 in the XY planar direction. Further, the vehicle state estimation portion 22 estimates a state value of the vehicle 1 regarding the vertical direction, such as the relative velocity (the piston velocity), the vehicle body vertical velocity (the sprung velocity), the relative displacement (the piston displacement), the roll rate, and the pith rate, as the state of the vehicle 1 in the vertical direction. To fulfill this function, as illustrated in FIG. 3, the vehicle state estimation portion 22 includes the vehicle XY-plane state estimation portion 24, which estimates (calculates) the state of the vehicle 1 in the XY planar direction, and the vehicle vertical state estimation portion 25, which estimates (calculates) the state of the vehicle 1 in the vertical direction.

The longitudinal acceleration sensor value, the lateral acceleration sensor value, the wheel velocity sensor value (×4), the steering angle sensor value, the yaw rate sensor value, the brake actuation state, the driving aid system operation state, and the like are input to the vehicle XY-plane state estimation portion 24 via the CAN 17. Further, the sprung velocity (the vehicle body vertical velocity), the piston velocity (the relative velocity), the piston displacement (the relative displacement), the roll rate and the pitch rate are input from the vehicle vertical state estimation portion 25 to the vehicle XY-plane state estimation portion 24. The vehicle XY-plane state estimation portion 24, for example, calculates a vehicle velocity corresponding to the velocity of the vehicle 1 (a vehicle body longitudinal velocity). The vehicle velocity is calculated (estimated) from, for example, the wheel velocity sensor value (×4). Further, the vehicle XY-plane state estimation portion 24, for example, calculates a first slip ratio, which refers to the slip ratio based on the wheel velocity.

Figure 10:
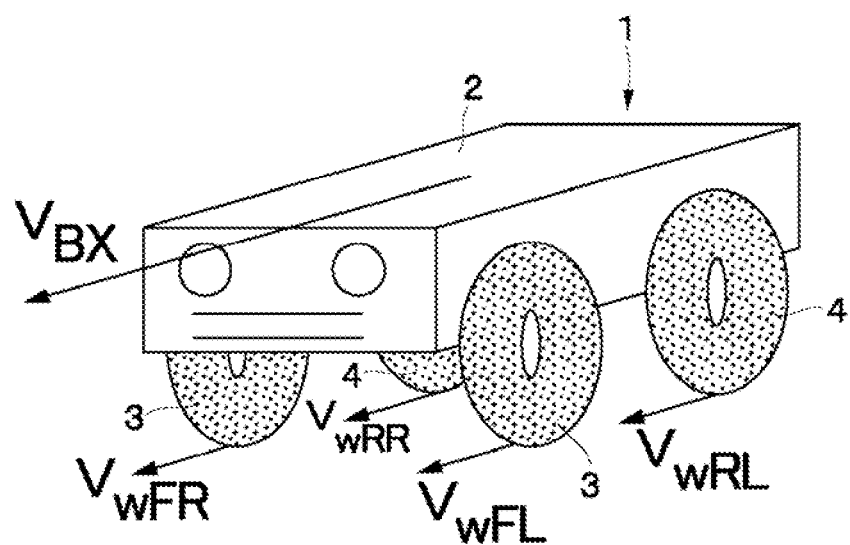
FIG. 10 illustrates respective wheel velocities VwFL, VwFR, VwRL, and VwRR of wheels, and a vehicle body longitudinal velocity VBx.

The first slip ratio is calculated from, for example, the vehicle velocity and the wheel velocity sensor value. Now, as illustrated in FIG. 10, assume that "VBx" represents the vehicle velocity (the vehicle body longitudinal velocity), "VwFL" represents the wheel velocity sensor value of the front wheel 3 on the left side, "VwFR" represents the wheel velocity sensor value of the front wheel 3 on the right side, "VwRL" represents the wheel velocity sensor value of the rear wheel 4 on the left side, and "VwRR" represents the wheel velocity sensor value of the rear wheel 4 on the right side. In this case, assume that "Vw" represents the wheel velocity sensor value, and the indexes "FL", "FR", "RL", and RR" indicate the positions of the wheels 3 and 4, respectively. Then, assuming that "λ" represents the first slip ratio referring to the slip ratio based on the wheel velocity, the first slip ratio λ as the slip ratio based on the wheel velocity can be calculated by the following equation 2.

$$\lambda = \frac{V_w - V_{Bx}}{\max(V_w, V_{Bx})} \quad \text{[Equation 2]}$$

The vehicle XY-plane state estimation portion 24 calculates the first slip ratio λ for each of the wheels 3 and 4 based on the equation 2. The vehicle XY-plane state estimation portion 24 outputs the calculated vehicle velocity and first slip ratio to the vehicle vertical state estimation portion 25. If the denominator in the equation 2 is near 0 (for example, the absolute value is 0.000001 m/s or smaller), the denominator is replaced with 0.000001 m/s, which serves as a value for preventing the slip ratio from being divided by zero. Further, if the vehicle velocity (the vehicle body longitudinal velocity) VBx is 2 km/h or lower, the wheel velocity is not output to the CAN signal, and therefore "0" is output without estimating the slip ratio. Because the slip ratio never exceeds the absolute value of 1, the calculated slip ratio is output after being subjected to saturation processing (a maximum value: 1 and a minimum value: −1).

Next, the vehicle vertical state estimation portion 25 will be described with additional reference to FIG. 4 along with FIG. 3.

The control signal (the control instruction) fed from the suspension control portion 23 is input to the vehicle vertical state estimation portion 25. Further, the longitudinal acceleration sensor value, the lateral acceleration sensor value, the wheel velocity sensor value (×4), the steering angle sensor value, the yaw rate sensor value, the brake actuation state, the driving aid system operation state, and the like are input to the vehicle vertical state estimation portion 25 via the CAN 17. Further, the vehicle velocity, the first slip ratio, and the like are input from the vehicle XY-plane state estimation portion 24 to the vehicle vertical state estimation portion 25. The vehicle vertical state estimation portion 25 estimates the sprung velocity (the vehicle body vertical velocity), the piston velocity (the relative velocity), the piston displacement (the relative displacement), the roll rate, and the pitch rate based on these inputs. To fulfill this function, the vehicle vertical state estimation portion 25 includes the wheel velocity and pitch rate estimation portion 26 and the vertical motion estimation portion 27 as illustrated in FIG. 4.

The control signal fed from the suspension control portion 23 is input to the wheel velocity and pitch rate estimation portion 26. Further, the lateral acceleration (the lateral acceleration sensor value), the longitudinal acceleration (the longitudinal acceleration sensor value), and another necessary LAN signal (a CAN signal) are input to the wheel velocity and pitch rate estimation portion 26 via the CAN 17. Further, the vehicle velocity and the first slip ratio are input from the vehicle XY-plane state estimation portion 24 to the wheel velocity and pitch rate estimation portion 26. The wheel velocity and pitch rate estimation portion 26 estimates (calculates) the vertical motion-derived wheel velocity (the third wheel velocity), which is the wheel velocity due to a vertical motion of the vehicle 1 (the vehicle body 2), based on these inputs. Further, the wheel velocity and pitch rate estimation portion 26 estimates (calculates) a pitch rate corresponding to a rotational angular velocity around a pitch axis extending in the lateral direction of the vehicle (the vehicle body 2). The wheel velocity and pitch rate estimation portion 26 outputs the estimated vertical motion-derived wheel velocity (the third wheel velocity) and pitch rate to the vertical motion estimation portion 27.

The control signal fed from the suspension control portion 23 is input to the vertical motion estimation portion 27. Further, the lateral acceleration (the lateral acceleration sensor value) and the longitudinal acceleration (the longitudinal acceleration sensor value) are input to the vertical motion estimation portion 27 via the CAN 17. Further, the vertical motion-derived wheel velocity (the third wheel velocity) and the pitch rate are input from the wheel velocity and pitch rate estimation portion 26 to the vertical motion estimation portion 27. The vertical motion estimation portion 27 estimates the sprung velocity (the vehicle body vertical velocity), the piston velocity (the relative velocity), the piston displacement (the relative displacement), the roll rate, and the pitch rate based on these inputs. The vertical motion estimation portion 27 corresponds to an observer that estimates unmeasurable information using a vehicle model (a motion equation) modeling the vehicle 1, such as the Kalman filter that estimates the present value based on the previous estimated value and the observed value.

As illustrated in FIG. 4, the wheel velocity and pitch rate estimation portion 26 includes a wheel velocity estimation portion 28, which estimates (calculates) the vertical motion-derived wheel velocity (the third wheel velocity), and a pitch rate estimation portion 29, which estimates (calculates) the pitch rate. Further, the wheel velocity and pitch rate estimation portion 26 includes a first wheel velocity and tire vertical force calculation portion 30 as illustrated in FIG. 5, which will be described below. The pitch rate estimation portion 29 estimates the pitch rate using, for example, the "sensor value acquired from the CAN 17" and the "state amount of the vehicle 1 regarding the planer direction that is estimated by the vehicle XY-plane state estimation portion 24" as inputs. The pitch rate estimation portion 29 outputs the estimated pitch rate to the vertical motion estimation portion 27.

Next, the wheel velocity estimation portion 28 and the first wheel velocity and tire vertical force calculation portion 30 will be described with additional reference to FIG. 5 along with FIG. 4.

As illustrated in FIG. 5, the longitudinal acceleration (the longitudinal acceleration sensor value) and the brake operation flag (the brake actuation state) from the CAN 17, the vehicle velocity and the first slip ratio from the vehicle XY-plane state estimation portion 24, and a first wheel velocity (a wheel velocity not containing a driver's operation-based vertical motion-derived wheel velocity) and the tire vertical force (a driver's operation-derived tire vertical force) from the first wheel velocity and tire vertical force calculation portion 30 are input to the wheel velocity estimation portion 28. The wheel velocity estimation portion 28 estimates (calculates) the vertical motion-derived wheel velocity (the third wheel velocity), which is the wheel velocity due to a vertical motion of the vehicle 1 (the vehicle body 2), based on these inputs. The wheel velocity estimation portion 28 outputs the estimated vertical motion-derived wheel velocity (the third wheel velocity) to the vertical motion estimation portion 27.

In the embodiment, the vertical motion-derived wheel velocity (the third wheel velocity) corresponds to the "wheel velocity due to a vertical motion of the vehicle 1 (the vehicle body 2)", more specifically, a "wheel velocity due to a road surface displacement (a wheel velocity due to a vertical motion based on a road surface input)". In other words, the "wheel velocity of the wheel velocity sensor 13 (the wheel velocity sensor value)" contains the "wheel velocity due to braking/driving (braking or driving) of the vehicle 1 (the braking/driving-derived wheel velocity)", the "wheel velocity due to a vertical motion based on a driver's operation (the driver's operation-based vertical motion-derived wheel velocity)", the "wheel velocity due to a slip of each of the wheels 3 and 4 (the slip-derived wheel velocity)", and the "wheel velocity due to a vertical motion of the vehicle 1 (the vehicle body 2) (the wheel velocity due to a road surface displacement)". The vertical motion-derived wheel velocity (the third wheel velocity) corresponds to a wheel velocity resulting from subtracting the "wheel velocity due to braking/driving (braking or driving) of the vehicle 1", the "wheel velocity due to a vertical motion based on a driver's operation", and the "wheel velocity due to a slip of each of the wheels 3 and 4" from the "wheel velocity of the wheel velocity sensor 13 (the wheel velocity sensor value)".

The "wheel velocity not containing the driver's operation-based vertical motion-derived wheel velocity (the first wheel velocity)" is input from the first wheel velocity and tire vertical force calculation portion 30 to the wheel velocity estimation portion 28. As will be described below, the first wheel velocity and tire vertical force calculation portion 30 calculates the "wheel velocity not containing the driver's operation-based vertical motion-derived wheel velocity (the first wheel velocity)" resulting from subtracting the "driver's operation-based vertical motion-derived wheel velocity" from the "wheel velocity of the wheel velocity sensor 13 (the wheel velocity sensor value)". The first wheel velocity and tire vertical force calculation portion 30 outputs the calculated "wheel velocity not containing the driver's operation-based vertical motion-derived wheel velocity (the first wheel velocity)" to the wheel velocity estimation portion 28. The wheel velocity estimation portion 28 calculates the vertical motion-derived wheel velocity (the third wheel velocity), which refers to the "wheel velocity due to a vertical motion of the vehicle 1 (the vehicle body 2) (the wheel velocity due to a road surface displacement)", by subtracting the "wheel velocity due to braking/driving (braking or driving) of the vehicle 1" and the "wheel velocity due to a slip of each of the wheels 3 and 4" from the "wheel velocity not containing the driver's operation-based vertical motion-derived wheel velocity (the first wheel velocity)". The first wheel velocity and tire vertical force calculation portion 30 will be described prior to a description of the wheel velocity estimation portion 28.

The first wheel velocity and tire vertical force calculation portion 30 calculates the "wheel velocity not containing the driver's operation-based vertical motion-derived wheel velocity (the first wheel velocity)" and the "tire vertical force generated due to a driver's operation (the driver's operation-derived tire vertical force)". The first wheel velocity and tire vertical force calculation portion 30 outputs the calculated first wheel velocity and tire vertical force to the wheel velocity estimation portion 28 (a second wheel velocity calculation portion 31). The "wheel velocity not containing the driver's operation-based vertical motion-derived wheel velocity (the first wheel velocity)" is calculated from a difference between a "wheel velocity in consideration of the turning radius difference (a gravity center position converted wheel velocity)" and the "driver's operation-based vertical motion-derived wheel velocity (the wheel velocity due to a vertical motion based on a driver's input)". The "wheel velocity in consideration of the turning radius difference (the wheel velocity converted as a wheel velocity at the position of the center of gravity)" can be calculated from the "steering angle (the steering angle sensor value)", the "vehicle body yaw rate (the yaw rate sensor value)", and the "wheel velocity of the wheel velocity sensor 13 (the wheel velocity sensor value)". For this purpose, the steering angle sensor value, the yaw rate sensor value, and the wheel velocity sensor value (×4) are input to the first wheel velocity and tire vertical force calculation portion 30.

Now, when the vehicle 1 is turning, a rotational difference is generated between a wheel on a radially inner side (an inner wheel) and a wheel on a radially outer side (an outer wheel) of a turning radius. To deal with that, a wheel velocity is calculated in consideration of the turning radius difference. In other words, the wheel velocities of the four wheels (the wheel velocity sensor values) are converted into wheel velocities VWcgfl, VWcgfr, VWcgrl, and VWcgrr at the position of the center of gravity of the vehicle 1. More specifically, the gravity center position converted wheel velocities VWcgfl, VWcgfr, VWcgrl, and VWcgrr of the respective wheels (the four wheels) are calculated using the following equations 3 to 6. In the following equations 3 to 6, the gravity center position converted wheel velocities are calculated by dividing the wheel velocities by an effective rotational radius considered to be common among the four wheels to improve the accuracy and multiplying the wheel velocities by effective rotational radii different between the front side and the rear side, after calculating the wheel velocities.

The indexes "fl", "fr", "rl", and "rr" correspond to the positions of the wheels 3 and 4, respectively. In the equations, "VWfl", "VWfr", "VWrl", and "VWrr" represent the wheel velocities of the four wheels (the sensor wheel velocity sensor values)", "δ" represents a tire angle, "df" represents a track width between the front wheels, "dr" represents a track width between the rear wheels, "rsen" represents the yaw rate sensor value, "Rrollo" represents an initial value of the tire effective radius, "Rrollf" represents an effective radius of the front wheel tire, and "Rrollr" represents an effective radius of the front wheel tire.

$$VW_{cgfl} = \left(VW_{fl} \cdot \cos\delta + \frac{1}{2}d_f \cdot r_{sen}\right)\frac{R_{rollf}}{R_{rollo}} \quad \text{[Equation 3]}$$

$$VW_{cgfr} = \left(VW_{fr} \cdot \cos\delta - \frac{1}{2}d_f \cdot r_{sen}\right)\frac{R_{rollf}}{R_{rollo}} \quad \text{[Equation 4]}$$

$$VW_{cgrl} = \left(VW_{rl} + \frac{1}{2}d_r \cdot r_{sen}\right)\frac{R_{rollr}}{R_{rollo}} \quad \text{[Equation 5]}$$

$$VW_{cgrr} = \left(VW_{rr} - \frac{1}{2}d_r \cdot r_{sen}\right)\frac{R_{rollr}}{R_{rollo}} \quad \text{[Equation 6]}$$

On the other hand, the "driver's operation-based vertical motion-derived wheel velocity (the wheel velocity due to a vertical motion based on a driver's input)" is calculated from a "vehicle body pitch rate generated due to a driver's operation", a "damper relative displacement/relative velocity generated due to a driver's operation", a "tire vertical force generated due to a driver's operation", and the "vehicle body velocity (the vehicle velocity)". The "vehicle body pitch rate generated due to a driver's operation" is calculated from the "vehicle body longitudinal acceleration (the longitudinal acceleration sensor value)". Further, the "damper relative displacement/relative velocity generated due to a driver's operation" is calculated from the "vehicle body pitch rate generated due to a driver's operation" and a "vehicle body roll rate generated due to a driver's operation". The "vehicle body roll rate generated due to a driver's operation" is calculated from the "vehicle body velocity (the vehicle velocity)", the "vehicle body yaw rate (the yaw rate sensor value)", and the "steering angle (the steering angle sensor value)". Further, the "tire vertical force generated due to a driver's operation" is calculated from the "damper relative displacement/relative velocity generated due to a driver's operation", the "damper damping force calculated from the damper instruction value", the "vehicle body longitudinal acceleration (the longitudinal acceleration sensor value)", and the "vehicle body lateral acceleration (the lateral acceleration sensor value)". For this purpose, the vehicle velocity, the longitudinal acceleration sensor value, the damper instruction value (the damper control current value), and the lateral acceleration sensor value are input to the first wheel velocity and tire vertical force calculation portion 30 besides the steering angle sensor value, the yaw rate sensor value, and the wheel velocity sensor value (×4).

The first wheel velocity and tire vertical force calculation portion 30 calculates the "driver's operation-based vertical motion-derived wheel velocity (the wheel velocity due to a vertical motion based on a driver's input)" based on the vehicle velocity, the longitudinal acceleration sensor value, the yaw rate sensor value, the steering angle sensor value, the damper instruction value (the damper control current value), and the lateral acceleration sensor value. In this case, the "driver's operation-based vertical motion-derived wheel velocity (the wheel velocity due to a vertical motion based on a driver's input)" can be calculated from a "wheel velocity due to a pitch change based on a driver's input", a "wheel velocity due to a suspension displacement based on a driver's input", and a "wheel velocity due to a load change based on a driver's input".

The "wheel velocity due to a pitch change based on a driver's input" is calculated in the following manner. That is, assuming that "VWza" represents the wheel velocity due to a pitch change based on a driver's input, "h" represents the height of the center of gravity of the vehicle body, and θyd represents a pitch rate based on a driver's input, VWza is calculated using the following equation 7.

$$VW_{za} = -h\dot{\theta}_{yd} \quad \text{[Equation 7]}$$

The "wheel velocity due to a suspension displacement based on a driver's input" is calculated in the following manner. That is, assuming that "VWzb" represents the "wheel velocity due to a suspension displacement based on a driver's input", "$Z_{21}$" represents the relative displacement of the suspension (the shock absorber), and "$V_{21}$" represents the relative velocity of the suspension (the shock absorber), VWzb is calculated using the following equation 8. In the equation 8, α1 and α2 represent a second-order and first-order coefficient and a zero-th-order coefficient of an approximate curve of the relationship between the wheel longitudinal displacement and the relative displacement, respectively. Then, "α" can be fittingly adjusted based on the vertical motion-derived wheel velocity equivalent to actual measurement using a vehicle height sensor.

$$VW_{zb} = (2\alpha_1 \cdot Z_{21} + \alpha_2)V_{21} \qquad \text{[Equation 8]}$$

The "wheel velocity due to a load change based on a driver's input" is calculated in the following manner. That is, assuming that "VWzc" represents the wheel velocity due to a load change based on a driver's input, "Vbx" represents the vehicle velocity that is the estimated vehicle body longitudinal velocity, "DFtz" represents a vertical force due to the suspension that is applied to the tire, "tire" represents the tire effective rotational radius, "kt" represents a tire vertical spring constant, and "n" represents a gradient of an approximate straight line of the tire effective rotational radius with respect to a vertical load, VWzc is calculated using the following equation 9. Then, "n" is determined by linearization from the tire specifications.

$$VW_{zc} = \frac{\eta \cdot Vbx}{Kt \cdot r_{tire}} DF_{tz} \qquad \text{[Equation 9]}$$

The "driver's operation-based vertical motion-derived wheel velocity (the wheel velocity due to a vertical motion based on a driver's input)" can be calculated by summing the calculated "wheel velocity due to a pitch change based on a driver's input", "wheel velocity due to a suspension displacement based on a driver's input", and "wheel velocity due to a load change based on a driver's input".

The first wheel velocity and tire vertical force calculation portion 30 calculates the "driver's operation-based vertical motion-derived wheel velocity (the wheel velocity due to a vertical motion based on a driver's input)" in this manner. The first wheel velocity and tire vertical force calculation portion 30 calculates the "wheel velocity not containing the driver's operation-based vertical motion-derived wheel velocity (the first wheel velocity)" by subtracting the above-described "driver's operation-based vertical motion-derived wheel velocity (the wheel velocity due to a vertical motion based on a driver's input)" from the above-described "wheel velocity in consideration of the turning radius difference (the gravity center position converted wheel velocity)". Further, the first wheel velocity and tire vertical force calculation portion 30 calculates the "tire vertical force generated due to a driver's operation" from the "damper relative displacement/relative velocity generated due to a driver's operation", the "damper damping force calculated from the damper instruction value", the "vehicle body longitudinal acceleration (the longitudinal acceleration sensor value)", and the "vehicle body lateral acceleration (the lateral acceleration sensor value)". The first wheel velocity and tire vertical force calculation portion 30 outputs the calculated "wheel velocity not containing the driver's operation-based vertical motion-derived wheel velocity (the first wheel velocity)" and "tire vertical force generated due to a driver's operation" to the wheel velocity estimation portion 28.

Next, the wheel velocity estimation portion 28 will be described.

As illustrated in FIG. 5, the wheel velocity estimation portion 28 includes the second wheel velocity calculation portion 31 and a third wheel velocity calculation portion 32. The longitudinal acceleration (the longitudinal acceleration sensor value) and the brake operation flag (the brake actuation state) from the CAN 17, the vehicle velocity and the first slip ratio from the vehicle XY-plane state estimation portion 24, and the first wheel velocity (the wheel velocity not containing the driver's operation-based vertical motion-derived wheel velocity) and the tire vertical force (the driver's operation-derived tire vertical force) from the first wheel velocity and tire vertical force calculation portion 30 are input to the second wheel velocity calculation portion 31.

In other words, the longitudinal acceleration, the brake actuation flag, the vehicle velocity, the tire vertical force for each of the wheels 3 and 4, the first wheel velocity for each of the wheels 3 and 4, and the first slip ratio for each of the wheels 3 and 4 are input to the second wheel velocity calculation portion 31. The second wheel velocity calculation portion 31 calculates a second wheel velocity (a wheel slip-considered wheel velocity) based on the longitudinal acceleration, the brake actuation flag, the vehicle velocity, the tire vertical force (the driver's operation-derived tire vertical force), the first wheel velocity (the wheel velocity not containing the driver's operation-based vertical motion-derived wheel velocity), and the first slip ratio (the slip ratio based on the wheel velocity). The second wheel velocity (the wheel slip-considered wheel velocity) corresponds to the slip-derived wheel velocity and the wheel velocity not containing the driver's operation-based vertical motion-derived wheel velocity.

That is, the second wheel velocity calculation portion 31 calculates the second wheel velocity (the wheel slip-considered wheel velocity) by subtracting the "wheel velocity due to a slip of each of the wheels 3 and 4" from the "wheel velocity not containing the driver's operation-based vertical motion-derived wheel velocity (the first wheel velocity)", and outputs this calculated second wheel velocity to the third wheel velocity calculation portion 32. The second wheel velocity (the wheel slip-considered wheel velocity) corresponds to a wheel velocity containing the "wheel velocity due to braking/driving (braking or driving) of the vehicle 1", and the "wheel velocity due to a vertical motion of the vehicle 1 (the vehicle body 2) (the wheel velocity due to a road surface displacement)".

The longitudinal acceleration and the second wheel velocity for each of the wheels 3 and 4 are input to the third wheel velocity calculation portion 32. The third wheel velocity calculation portion 32 calculates the third wheel velocity (the vertical motion-derived wheel velocity) based on the longitudinal acceleration and the second wheel velocity (the wheel slip-considered wheel velocity). That is, the third wheel velocity calculation portion 32 calculates the wheel velocity due to braking/driving (braking or driving) of the vehicle 1 based on the longitudinal acceleration. The third wheel velocity calculation portion 32 calculates the third wheel velocity (the vertical motion-derived wheel velocity by subtracting the "wheel velocity due to braking/driving (braking or driving) of the vehicle 1" from the "wheel slip-considered wheel velocity (the second wheel velocity)", and outputs this calculated third wheel velocity to the vertical motion estimation portion 27. The third wheel velocity (the vertical motion-derived wheel velocity) corresponds to the "wheel velocity due to a vertical motion of the vehicle 1 (the vehicle body 2) (the wheel velocity due to a road surface displacement)".

Next, the second wheel velocity calculation portion 31 will be described with reference to FIG. 6.

The second wheel velocity calculation portion 31 calculates the second wheel velocity (the wheel slip-considered wheel velocity), i.e., the wheel velocity containing the "wheel velocity due to braking/driving (braking or driving) of the vehicle 1" and the "wheel velocity due to a vertical motion of the vehicle 1 (the vehicle body 2) (the wheel velocity due to a road surface displacement)". More specifically, the second wheel velocity calculation portion 31 calculates the second wheel velocity, which refers to the wheel slip-considered wheel velocity, by subtracting the wheel velocity due to a slip from the first wheel velocity (the wheel velocity not containing the driver's operation-based vertical motion-derived wheel velocity). To fulfill this function, the second wheel velocity calculation portion 31 includes a corrected longitudinal acceleration calculation portion 33, a slip ratio replacement coefficient calculation portion 34, a slip ratio calculation portion 35, a slip-derived wheel velocity calculation portion 36, and a subtraction portion 37.

The longitudinal acceleration, the tire vertical force (the driver's operation-derived tire vertical force), and the brake actuation flag are input to the corrected longitudinal acceleration calculation portion 33. The corrected longitudinal acceleration calculation portion 33 performs processing for correcting a longitudinal acceleration generated at the time of driving into an acceleration corresponding to a four-wheel drive vehicle, in a case where the vehicle 1 is assumed to be a two-wheel drive vehicle. This is because the processing for calculating the slip ratio based on the longitudinal acceleration (a second slip ratio calculation portion 38, a slip ratio distribution calculation portion 39, and a third slip ratio calculation portion 40 in FIG. 7), which will be described below, is a calculation (estimation) of the slip ratio assuming that the vehicle 1 is braked/driven on four wheels. In other words, the corrected longitudinal acceleration calculation portion 33 performs processing for converting the longitudinal acceleration into the longitudinal acceleration corresponding to a four-wheel drive vehicle.

The corrected longitudinal acceleration calculation portion 33 outputs the corrected longitudinal acceleration using the longitudinal acceleration, the tire vertical force (the driver's operation-derived tire vertical force), and the brake actuation flag as inputs. At the time of braking with the brake actuation flag set to "1", four-wheel braking is carried out and therefore the correction is unnecessary. In this case, assuming that "Gx" represents the longitudinal acceleration, the corrected longitudinal acceleration "Gxf" is expressed as the following equation 10.

$$Gxf = Gx \qquad \text{[Equation 10]}$$

Next, at the time of driving with the brake actuation flag set to "0", the correction is necessary in a case of the vehicle 1 that is a front-wheel drive vehicle. In this case, assuming that "FzoFL", "FzoFR", "FzoRL", and "FzoRR" represent driver's operation-derived tire vertical forces, the corrected longitudinal acceleration "Gxf" is expressed as the following equation 11. In this equation, "Fzo" corresponds to the driver's operation-derived tire vertical force, and the indexes "FL", "FR", "RL", and "RR" correspond to the positions of the wheels 3 and 4, respectively.

$$Gxf = Gx\left(\frac{FzoFL + FzoFR + FzoRL + FzoRR}{FzoFL + FzoFR}\right) \qquad \text{[Equation 11]}$$

An upper limit of the tire longitudinal force is proportional to the magnitude of the tire vertical force. That is, the ratio of accelerations of a two-wheel drive vehicle and a four-wheel drive vehicle is considered to be the same as the ratio of tire vertical forces applied to drive wheels. The corrected longitudinal acceleration calculation portion 33 estimates (calculates) the longitudinal acceleration corresponding to a four-wheel drive vehicle by calculating a ratio of the tire vertical forces of the four wheels and the drive wheels and multiplying the longitudinal acceleration at the time of driving of a two-wheel drive vehicle by it based on this relationship. The corrected longitudinal acceleration calculation portion 33 outputs the calculated corrected longitudinal acceleration Gxf to the slip ratio calculation portion 35.

Figure 8:
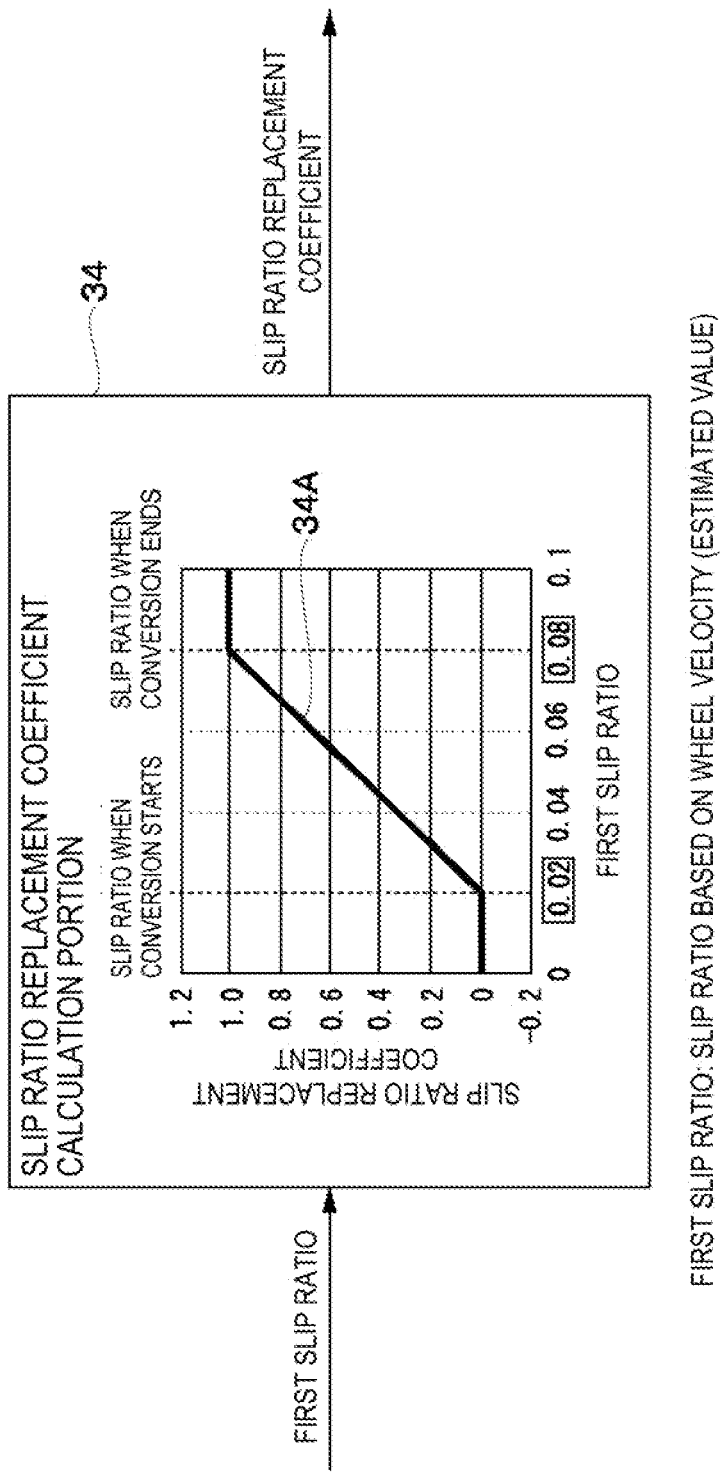
FIG. 8 is a block diagram illustrating a slip ratio replacement coefficient calculation portion illustrated in FIG. 6.

The first slip ratio, i.e., the slip ratio based on the wheel velocity calculated by the vehicle XY-plane state estimation portion 24 is input to the slip ratio replacement coefficient calculation portion 34. As illustrated in FIG. 8, the slip ratio replacement coefficient calculation portion 34 calculates a slip ratio replacement coefficient corresponding to the input value of the first slip ratio based on the relationship between the "first slip ratio" and the "slip ratio replacement coefficient" (a characteristic line 34A in FIG. 8). In other words, the slip ratio replacement coefficient calculation portion 34 calculates the slip ratio replacement coefficient based on the relationship indicated by the characteristic line 34A illustrated in FIG. 8 with use of the first slip ratio referring to the slip ratio estimated based on the wheel velocity as an input. As will be described below, the slip ratio replacement coefficient is used in processing for gradually replacing the slip ratio based on the longitudinal acceleration (a third slip ratio, which will be described below) with the slip ratio based on the wheel velocity (the first slip ratio).

As illustrated in FIG. 8, the slip ratio replacement coefficient is set to "0" when the slip ratio is equal to or lower than a threshold value on the low side and to "1" when the slip ratio is equal to or higher than a threshold value on the high side, and are linearly interpolated therebetween. The threshold value on the low side (for example, 0.02) can be set as an upper limit of the slip ratio when the wheel slip-considered wheel velocity is calculated according to the slip ratio based on the longitudinal acceleration and the tire characteristic, which will be described below (the third slip ratio, which will be described below). On the other hand, the threshold value on the high side (for example, 0.08) can be set based on a slip ratio at which the driving aid system such as the traction control system starts to be actuated.

In other words, in the embodiment, for example, "O" is calculated as the slip ratio replacement coefficient if the first slip ratio is 0.02 or lower, and "1" is calculated as the slip ratio replacement coefficient if the first slip ratio is 0.08 or higher. If the first slip ratio is 0.02 or higher and 0.08 or lower, the slip ratio replacement coefficient is calculated based on a characteristic of a linearly interpolated proportional relationship. The slip ratio replacement coefficient serves as a coefficient for switching the slip ratio based on the longitudinal acceleration and the tire characteristic (the third slip ratio), which will be described below, and the slip ratio based on the wheel velocity (the first slip ratio) according to the slip ratio based on the wheel velocity at that time. The slip ratio replacement coefficient calculation portion 34 outputs the calculated slip ratio replacement coefficient to the slip ratio calculation portion 35.

The corrected longitudinal acceleration Gxf, the brake actuation flag, the first slip ratio (the slip ratio based on the wheel velocity), and the slip ratio replacement coefficient are input to the slip ratio calculation portion 35. The slip ratio calculation portion 35 calculates a slip ratio (a fifth slip ratio) based on the corrected longitudinal acceleration Gxf, the brake actuation flag, the first slip ratio, and the slip ratio replacement coefficient. The slip ratio calculation portion 35 outputs the calculated slip ratio (the fifth slip ratio) to the slip-derived wheel velocity calculation portion 36. The details of the slip ratio calculation portion 35 will be described below.

The first wheel velocity, the vehicle velocity, and the slip ratio (the fifth slip ratio) are input to the slip-derived wheel velocity calculation portion 36. The slip-derived wheel velocity calculation portion 36 calculates the slip-derived wheel velocity using the slip ratio (the fifth slip ratio) estimated (calculated) by the slip ratio calculation portion 35, the first wheel velocity, which is the wheel velocity not containing the driver's operation-based vertical motion-derived wheel velocity calculated by the first wheel velocity and the tire vertical force calculation portion 30, and the vehicle velocity as inputs. Assuming that "Vwslip" represents the slip-derived wheel velocity, "λm represents the fifth slip ratio, "Vmno" represents the first wheel velocity, and "Vb" represents the vehicle velocity, the slip-derived wheel velocity Vwslip is expressed as the following equation 12. The slip-derived wheel velocity calculation portion 36 calculates the slip-derived wheel velocity Vwslip based on the equation 12, and outputs the calculated slip-derived wheel velocity Vwslip to the subtraction portion 37.

$$Vwslip = \lambda m \cdot \max(V_{wno}, V_b) \quad \text{[Equation 12]}$$

The first wheel velocity and the slip-derived wheel velocity Vwslip are input to the subtraction portion 37. The subtraction portion 37 calculates the second wheel velocity by subtracting the slip-derived wheel velocity Vwslip from the first wheel velocity Vwno, which is the wheel velocity not containing the driver's operation-based vertical motion-derived wheel velocity. The second wheel velocity, which refers to the wheel slip-considered wheel velocity, corresponds to a wheel velocity containing the "wheel velocity due to braking/driving (braking or driving) of the vehicle 1" and the "wheel velocity due to a vertical motion of the vehicle 1 (the vehicle body 2) (the wheel velocity due to a road surface displacement)". The subtraction portion 37 outputs the calculated second wheel velocity (the wheel slip-considered wheel velocity) to the third wheel velocity calculation portion 32.

Figure 7:
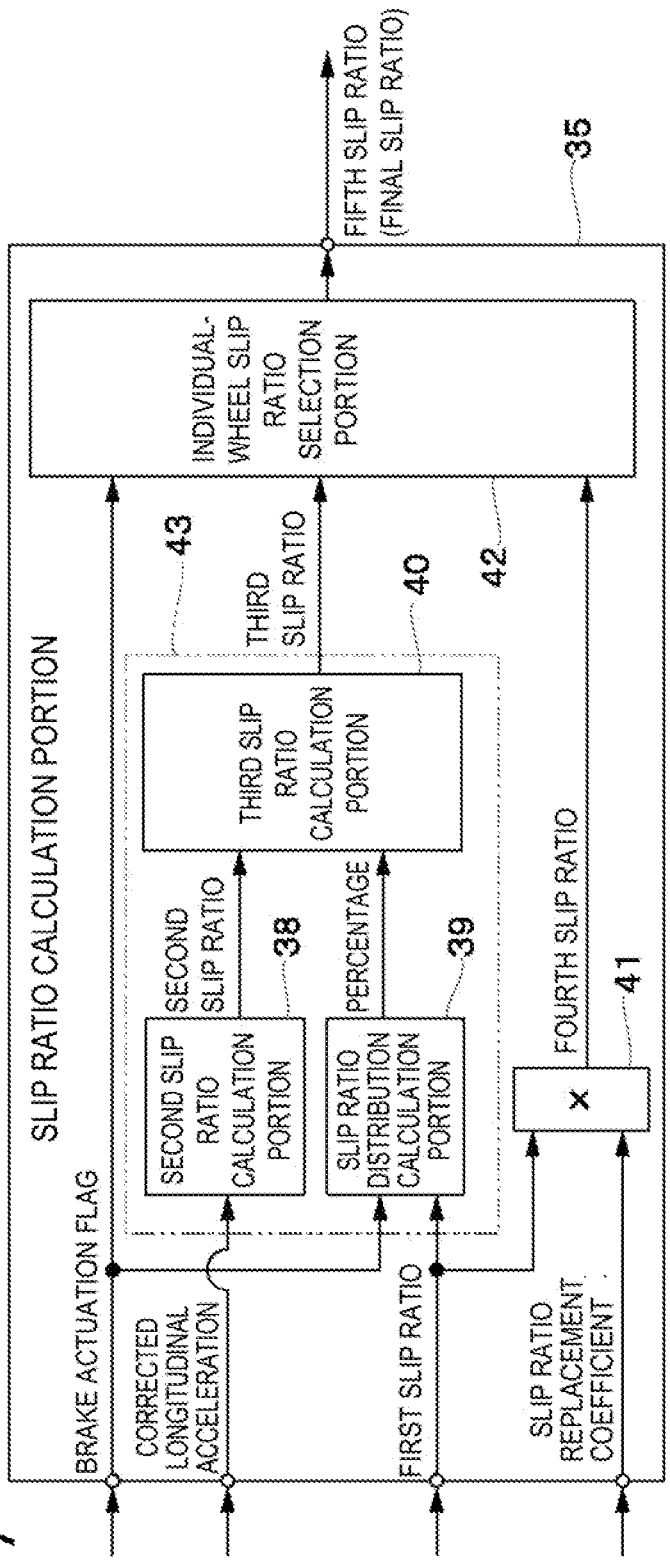
FIG. 7 is a block diagram illustrating a slip ratio calculation portion illustrated in FIG. 6.

Next, the slip ratio calculation portion 35 will be described with reference to FIG. 7.

The slip ratio calculation portion 35 includes the second slip ratio calculation portion 38, the slip ratio distribution calculation portion 39, the third slip ratio calculation portion 40, a multiplication portion 41, and an individual-wheel slip ratio selection portion 42. The corrected longitudinal acceleration is input to the second slip ratio calculation portion 38. The second slip ratio calculation portion 38 calculates a slip ratio based on the tire characteristic (a second slip ratio) from the corrected longitudinal acceleration calculated by the corrected longitudinal acceleration calculation portion 33. In other words, the second slip ratio calculation portion 38 calculates a slip ratio (a slip component) of each wheel based on the longitudinal acceleration of the vehicle body 2 of the vehicle 1 (the vehicle body longitudinal acceleration) and the tire characteristic (for example, a known tire characteristic acquired from a tire characteristic test in advance). More specifically, the slip ratio calculation portion 35 estimates the slip ratio by multiplying the longitudinal acceleration (the vehicle body longitudinal acceleration) by a slip ratio multiplication coefficient (a slip ratio coefficient) based on a tire longitudinal characteristic.

Figure 11:
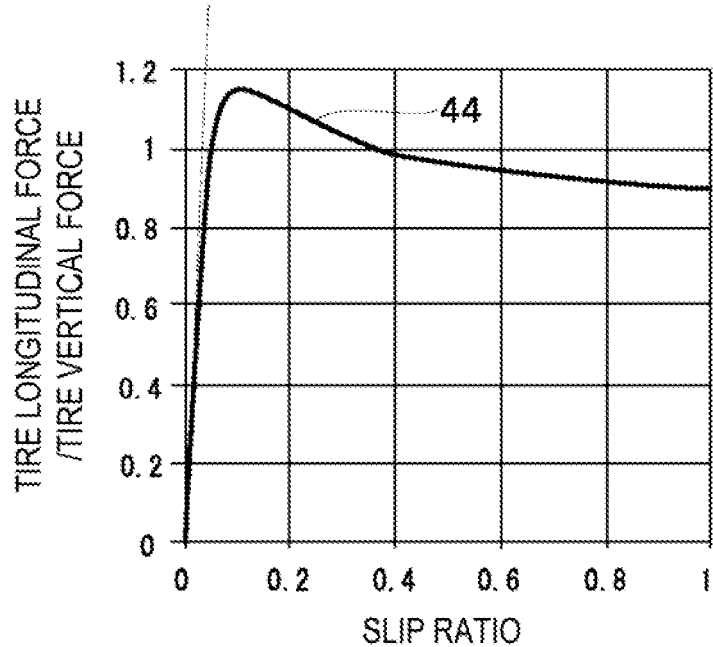
FIG. 11 illustrates a characteristic line indicating one example of the relationship between a "slip ratio" and a "tire longitudinal force/tire vertical force".
Figure 12:
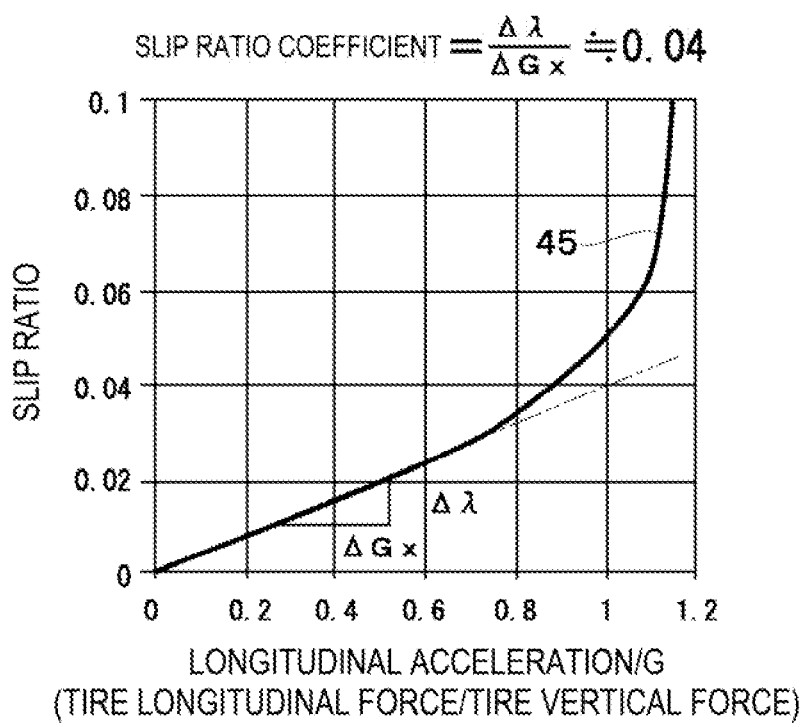
FIG. 12 illustrates a characteristic line indicating one example of the relationship between a "longitudinal acceleration/g (=tire longitudinal force/tire vertical force)" and the "slip ratio".

FIGS. 11 and 12 illustrate the tire longitudinal characteristic. A characteristic line 44 in FIG. 11 indicates one example of the relationship between the "slip ratio" and a "tire longitudinal force/tire vertical force". A characteristic line 45 in FIG. 12 indicates one example of the relationship between a "longitudinal acceleration/g (=tire longitudinal force/tire vertical force)" and the "slip ratio". In FIG. 12, the vertical axis and the horizontal axis in FIG. 11 are interchanged, and are labeled differently using an equation that will be described below. Further, the characteristic line 45 in FIG. 12 corresponds to a range of the characteristic line 44 in FIG. 11 where the slip ratio is 0 to 0.1. The characteristics illustrated in FIGS. 11 and 12 vary depending on the type and the specifications of the vehicle 1, the type and the specifications of the tire, and the like. The embodiment will be described citing the vehicle 1 and the tire having the characteristics illustrated in FIGS. 11 and 12 by way of example.

Figure 9:
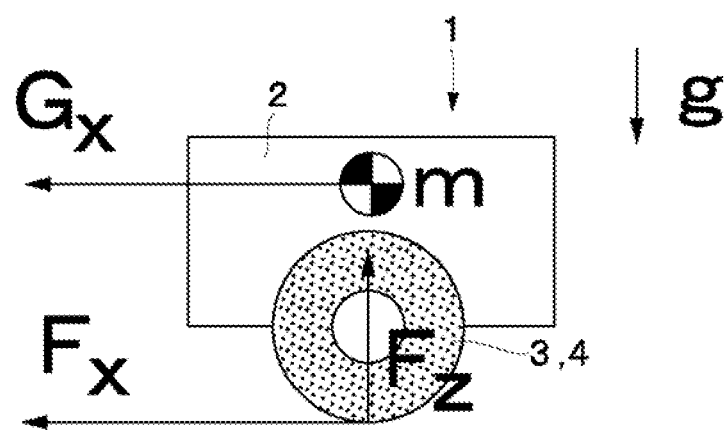
FIG. 9 illustrates a sum Fx of tire longitudinal forces, a sum Fz of tire vertical forces, a vehicle body longitudinal acceleration (a corrected longitudinal acceleration Gxf), a vehicle weight m, and a gravitational acceleration g.

As illustrated in FIG. 9, assume that "Fx" represents a sum of tire longitudinal forces, "Fz" represents a sum of tire vertical forces generated on the vehicle 1, "m" represents the weight of the vehicle, "g" represents a gravitational acceleration, "Gx" represents the acceleration, and "μ" represents a frictional coefficient. In this case, the following equation 13 can be acquired according to a motion equation.

$$Fx = m \cdot Gx = m \cdot (\mu \cdot g) \quad \text{[Equation 13]}$$

Then, a value resulting from dividing the tire longitudinal forces by the tire vertical forces is expressed as the following equation 14.

$$\frac{Fx}{Fz} = \frac{m \cdot Gx}{Fz} \quad \text{[Equation 14]}$$

Further, hypothetically supposing that the tire vertical forces are constituted only by the load of the vehicle body, the following equation 15 is established.

$$\frac{Fx}{Fz} = \frac{m \cdot Gx}{Fz} = \frac{m \cdot Gx}{m \cdot g} = \frac{Gx}{g} \quad \text{[Equation 15]}$$

Then, assuming that the gradient in FIG. 12 indicates a slip ratio coefficient "kws", "Gxf" represents the corrected longitudinal acceleration, and "λgx" represents the slip ratio, the slip ratio λgx is expressed as the following equation 16.

$$\lambda gx = kws\frac{Fx}{Fz} = kws\frac{Gxf}{g} = \frac{\Delta\lambda}{g \cdot \Delta Gx}Gxf \quad \text{[Equation 16]}$$

According to this equation 16, for example, the slip ratio coefficient kws is calculated to be 0.04 in FIG. 12. The slip ratio calculation portion 35 calculates the slip ratio of each wheel based on the tire characteristic (the second slip ratio) by multiplying the corrected longitudinal acceleration Gxf of each wheel by the slip ratio coefficient kws. In the embodiment, a practical use region is assumed to be a linear range, such as a region as far as a slip ratio of 0.02 (a slight slip region). That is, in this practical use region, the slip ratio coefficient kws is linear and therefore is used while being linearly approximated.

On the other hand, the equation 16 is established, hypothetically supposing that the slip ratio is the same on all of the wheels, thereby requiring distribution of the slip ratio of each wheel. In light thereof, the slip ratio distribution calculation portion 39 calculates a distribution ratio, and the third slip ratio calculation portion 40 distributes the second slip ratio calculated by the second slip ratio calculation portion 38 to each wheel. For this purpose, the second slip ratio calculation portion 38 outputs the calculated slip ratio, i.e., the second slip ratio calculated based on the tire characteristic (the slip ratio coefficient) illustrated in FIG. 11 and the longitudinal acceleration (the corrected longitudinal acceleration) to the third slip ratio calculation portion 40.

The brake actuation flag and the first slip ratio are input to the slip ratio distribution calculation portion 39. The slip ratio distribution calculation portion 39 calculates a percentage of the slip ratio of each wheel based on the first slip ratio, i.e., the slip ratio of each wheel calculated from the wheel velocity. The slip ratio distribution calculation portion 39 does not calculate the slip ratio but calculates only the distribution (the percentage) of the slip ratio of each wheel. In other words, the first slip ratio calculated by the vehicle XY-plane state estimation portion 24 using the above-described equation 2 can be calculated wheel by wheel but is not accurate enough to determine the wheel slip-derived wheel velocity because it contains the vertical motion-derived wheel velocity. However, the first slip ratio does not largely deviate in terms of an overall percentage of the slip ratio of each wheel. Therefore, the slip ratio distribution calculation portion 39 calculates the slip percentage of each wheel based on the first slip ratio of each wheel.

More specifically, the slip ratio distribution calculation portion 39 calculates the percentage (the distribution) of the slip ratio of each wheel using the following equation 17. In the equation 17, "$R_\lambda$" represents the percentage, and "$\lambda$" represents the slip ratio (the first slip ratio). Further, the index "oo" corresponds to any of "FL", "FR", "RL, and "RR", which indicate the positions of the wheels 3 and 4. For example, the percentage $R_\lambda$ assigned to the front wheel 3 on the left side is represented by "$R_{\lambda FL}$", and the slip ratio (the first slip ratio) thereof is represented by "$\lambda_{FL}$"

$$R_{\lambda oo} = \frac{\lambda_{oo}}{(\lambda_{FR} + \lambda_{FL} + \lambda_{RR} + \lambda_{RL})/4} \quad \text{[Equation 17]}$$

Further, since the vehicle 1 is a two-wheel drive vehicle, the slip ratio is distributed among the four wheels at the time of deceleration, and otherwise is distributed between the drive wheels and is set to 0 for the driven wheels. Whether the vehicle is decelerated or not is determined based on the brake actuation flag. The slip ratio distribution calculation portion 39 outputs the calculated percentage (the distribution) of the slip ratio of each wheel, i.e., the percentage $R_{\lambda FL}$, the percentage $R_{\lambda FR}$, the percentage $R_{\lambda RL}$, and the percentage $R_{\lambda RR}$ to the third slip ratio calculation portion 40.

The second slip ratio and the percentage of the slip ratio of each wheel ($R_{\lambda FL}$, $R_{\lambda FR}$, $R_{\lambda RL}$, and $R_{\lambda RR}$) are input to the third slip ratio calculation portion 40. The third slip ratio calculation portion 40 calculates the slip ratio of each wheel based on the second slip ratio calculated by the second slip ratio calculation portion 38 (the slip ratio of each wheel based on the tire characteristic) and the percentage calculated by the slip ratio distribution calculation portion 39 (the percentage of the slip ratio of each wheel). More specifically, the third slip ratio calculation portion 40 calculates the slip ratio of each wheel (the third slip ratio) by multiplying the second slip ratio by the percentage for each wheel individually. The slip ratio calculated by the third slip ratio calculation portion 40 corresponds to a slip ratio of each wheel that is calculated by correcting the slip ratio determined based on the vehicle body longitudinal acceleration and the tire characteristic (the second slip ratio) (distributing it to each wheel), i.e., a slip ratio calculated from the longitudinal acceleration and the tire characteristic (a third slip ratio). The third slip ratio calculation portion 40 outputs the calculated third slip ratio to the individual-wheel slip ratio selection portion 42.

If the intermediate slip (for example, 0.02 or higher) is acquired as the third slip ratio, an estimation error of the vertical motion-derived wheel velocity may increase and the vertical motion state amount may be dispersed. In light thereof, in the embodiment, the slip ratio calculated from the longitudinal acceleration and the tire characteristic (the third slip ratio) is gradually replaced with the slip ratio based on the wheel velocity (the first slip ratio) according to the slip ratio at that time. To fulfill this function, the embodiment includes the above-described slip ratio replacement coefficient calculation portion 34, the multiplication portion 41, and the individual-wheel slip ratio selection portion 42. This prevents the vertical motion state amount from being dispersed when the intermediate slip (for example, 0.02 or higher) is acquired as the slip ratio.

In other words, the multiplication portion 41 and the individual-wheel slip ratio selection portion 42 switch the slip ratio based on the longitudinal acceleration (the third slip ratio) to the slip ratio based on the wheel velocity (the first slip ratio) according to the slip ratio calculated from the wheel velocity. The slip ratio based on the wheel velocity (the first slip ratio) and the slip ratio replacement coefficient are input to the multiplication portion 41. The multiplication portion 41 calculates a slip ratio based on the wheel velocity for the replacement (a fourth slip ratio) by multiplying the slip ratio based on the wheel velocity (the first slip ratio) by the slip ratio replacement coefficient. The multiplication portion 41 outputs the calculated fourth slip ratio (the first slip ratio for the replacement) to the individual-wheel slip ratio selection portion 42.

The brake actuation flag, the third slip ratio, and the fourth slip ratio are input to the individual-wheel slip ratio selection portion 42. The individual-wheel slip ratio selection portion 42 selects one of the third slip ratio and the fourth slip ratio according to the brake operation situation, and outputs the selected slip ratio to the slip-derived wheel velocity calculation portion 36 as a final slip ratio (the fifth slip ratio). More specifically, the individual-wheel slip ratio selection portion 42 compares the third slip ratio and the fourth slip ratio, and selects a slip ratio having a larger value while the brake is not actuated and selects a slip ratio having a smaller value while the brake is actuated. The individual-wheel slip ratio selection portion 42 outputs the selected slip ratio (the third slip ratio or the fourth slip ratio) to the slip-derived wheel velocity calculation portion 36 as the fifth slip ratio.

Whether to select a larger value or a smaller value is changed according to the brake actuation state for the purpose of allowing a higher slip ratio (a slip ratio having a larger absolute value) to be selected even when the positive/negative sign of the acceleration is changed according to the brake actuation state. Further, the reason why the individual-wheel slip ratio selection portion 42 selects the third slip ratio or the fourth slip ratio, i.e., does not always employ the slip ratio calculated from the wheel velocity is that the slip ratio calculated from the wheel velocity also contains the vertical motion component (the vertical motion-derived wheel velocity). That is, the reason is that the slip ratio calculated from the wheel velocity also contains the vertical motion component (the vertical motion-derived wheel velocity), and therefore employing the slip ratio calculated from the wheel velocity at 100% makes it difficult to estimate the state of the vertical motion.

In this manner, according to the embodiment, the suspension control unit 21 includes a slip state detection apparatus 43 for detecting the slip state of the wheels 3 and 4. The slip state detection apparatus 43 includes the second slip ratio calculation portion 38 as a tire characteristic-considered slip ratio determination unit, and the slip ratio distribution calculation portion 39 and the third slip ratio calculation portion 40 as a corrected slip ratio determination unit. The second slip ratio calculation portion 38 calculates the tire characteristic-considered slip ratio (the second slip ratio) according to the longitudinal acceleration signal of the vehicle 1 detected by the longitudinal acceleration sensor 11 (the longitudinal acceleration) and the tire characteristic (the slip ratio coefficient). The slip ratio distribution calculation portion 39 and the third slip ratio calculation portion 40 determine the corrected slip ratio of each wheel (the third slip ratio) by correcting the tire characteristic-considered slip ratio (the second slip ratio) according to the slip ratio of each wheel (more specifically, the percentage of the slip ratio) acquired according to the rotational velocity signal of each of the wheels 3 and 4 (the wheel velocity). Therefore, the embodiment can improve the accuracy of the slip ratio of each of the wheels 3 and 4, and thus the slip-derived wheel velocity calculated based on the slip ratio.

Further, according to the embodiment, the suspension system includes the longitudinal acceleration sensor 11 as a longitudinal acceleration detection unit, the wheel velocity sensor 13 as a wheel rotational velocity detection unit, the suspension control unit 21 as a control device, and the shock absorbers 7 and 10 (the damping force adjustment mechanism such as the damping force adjustment valve and the solenoid for adjusting the damping force) as an actuator. The longitudinal acceleration sensor 11 detects the longitudinal acceleration of the vehicle 1 and outputs the longitudinal acceleration signal. The wheel velocity sensor 13 detects the rotational velocity of each of the wheels 3 and 4, and outputs the rotational velocity signal of each of the wheels 3 and 4.

The longitudinal acceleration signal and the rotational velocity signal of each of the wheels 3 and 4 are input to the suspension control unit 21. The suspension control unit 21 (for example, the second slip ratio calculation portion 38) calculates the tire characteristic-considered slip ratio (the second slip ratio) from the input longitudinal acceleration signal (the longitudinal acceleration) and the tire characteristic (the slip ratio coefficient). The suspension control unit 21 (for example, the slip ratio distribution calculation portion 39 and the third slip ratio calculation portion 40) calculates the corrected slip ratio of each wheel (the third slip ratio) by correcting (distributing) the tire characteristic-considered slip ratio according to the rotational velocity signal of each of the wheels 3 and 4 (the wheel velocity).

The suspension control unit 21 (for example, the slip-derived wheel velocity calculation portion 36, the subtraction portion 37, the third wheel velocity calculation portion 32, and the vertical motion estimation portion 27) corrects the vertical motion of the vehicle body 2 estimated based on the rotational velocity signal of each of the wheels 3 and 4 (the wheel velocity) based on the corrected slip ratio of each wheel. The suspension control unit 21 (for example, the suspension control portion 23) outputs the control signal based on the corrected vertical motion of the vehicle body 2. The shock absorbers 7 and 10 (the damping force adjustment mechanism) are provided between the vehicle body 2 and the wheel 3 and 4-side members. The shock absorbers 7 and 10 (the damping force adjustment mechanism) change the state of the vehicle body 2 in reaction to inputs from the wheel 3 and 4-side members according to the control signal of the suspension control unit 21. Therefore, the embodiment can improve the accuracy of estimating the state of the vehicle body 2 in the vertical direction, thereby improving the ride comfort and the driving stability of the vehicle 1.

The slip state detection apparatus and the suspension control apparatus (the suspension system) according to the embodiment are configured in the above-described manner, and the operations thereof will be described next.

When the behavior (the state) of the vehicle 1 changes as, for example, the vehicle 1 runs, this change in the behavior is detected by the longitudinal acceleration sensor 11, the lateral acceleration sensor 12, the wheel velocity sensors 13, the yaw rate sensor 15, and the like mounted on the vehicle 1. Further, the operation of the driver, which is an operator of the vehicle 1, is detected by the steering angle sensor 14, the brake switch 16, and the like. The detection signals of these sensors 11, 12, 13, 14, and 15, and the switch 16 are input to the suspension control unit 21, which controls the shock absorbers 7 and 10 via the CAN 17. The suspension control unit 21 outputs the control signal for controlling the damping force of each of the shock absorbers 7 and 10 to each of the shock absorbers 7 and 10 based on the input signals. As a result, the ride comfort and the driving stability of the vehicle 1 can be improved.

Now, according to the embodiment, the slip state determination apparatus 43 of the suspension control unit 21 determines the "corrected slip ratio (the third slip ratio)" of each wheel by calculating the "tire characteristic-considered slip ratio (the second slip ratio)" according to the longitudinal acceleration of the vehicle 1 and the tire characteristic and correcting this "tire characteristic-considered slip ratio (the second slip ratio)" according to the slip ratio of each wheel calculated according to the rotational velocity of each of the wheels 3 and 4 (the wheel velocity). Therefore, the slip ratio of each wheel can be accurately determined as the "corrected slip ratio (the third slip ratio)". As a result, the accuracy of estimating the slip ratio can be improved.

Further, according to the embodiment, the suspension control unit 21 determines the "corrected slip ratio (the third slip ratio)" of each wheel by correcting the "tire characteristic-considered slip ratio (the second slip ratio)" calculated from the longitudinal acceleration of the vehicle 1 and the tire characteristic according to the rotational velocity of each of the wheels 3 and 4 (the wheel velocity), and corrects the "vertical motion of the vehicle body 2" estimated from the rotational velocity of each of the wheels 3 and 4 based on this "corrected slip ratio (the third slip ratio)". Therefore, the state of the vehicle body 2 in the vertical direction can be accurately determined. As a result, the accuracy of estimating the state of the vehicle body 2 in the vertical direction can be improved. In addition, the suspension control unit 21 controls the shock absorbers 7 and 10 (the damping force adjustment mechanism) that change the state of the vehicle body 2 based on the corrected vertical motion of the vehicle body 2. Therefore, the ride comfort and the driving stability of the vehicle 1 can be improved.

The embodiment has been described citing the example in which a known tire characteristic acquired from a tire characteristic test in advance is used as the tire characteristic. However, the tire characteristic is not limited thereto, and may be learned (machine-learned) based on a detection value such as the wheel velocity, the vehicle velocity, and/or the acceleration detected while the vehicle 1 is running and be variable according to the learning result. Further, there is a possibility that the tire characteristic is changed when the tire of the vehicle 1 is replaced, such as when the tire is switched from a normal tire (a summer tire) to a studless tire (a winter tire), a low rolling resistance tire, a sports running tire (a high-grip tire), or the like. Therefore, when the tire is replaced (i.e., when the tire characteristic is changed), the setting is changed to the tire characteristic corresponding to the type, the specifications, and the like of the new tire as necessary.

The embodiment has been described citing the example in which the damping force adjustable hydraulic shock absorber, i.e., the hydraulic semi-active damper is used as the shock absorbers 7 and 10. However, the shock absorbers 7 and 10 are not limited thereto, and, for example, another type of semi-active damper such as an ER damper (an electrorheological fluid damper) may be used as the shock absorber (the actuator). Alternatively, examples usable as the shock absorber (the actuator) include various kinds of force generation apparatuses provided between a vehicle body and a wheel (a wheel-side member), such as a hydraulic actuator that is a full-active damper, an air spring of an air suspension apparatus, a stabilizer and an adjustment actuator that adjusts the effect of this stabilizer, and a linear motor constituting an electromagnetic suspension.

Possible configurations as the slip state detection apparatus and the suspension control apparatus based on the above-described embodiment include the following examples.

As a first configuration, a slip state detection apparatus includes a tire characteristic-considered slip ratio determination portion configured to determine a tire characteristic-considered slip ratio according to a longitudinal acceleration of a vehicle detected by a longitudinal acceleration detection portion and a tire characteristic, and a corrected slip ratio determination portion configured to determine a corrected slip ratio of each wheel by correcting the tire characteristic-considered slip ratio according to a slip ratio of each wheel determined according to a rotational velocity signal of each wheel.

According to this configuration, the "corrected slip ratio" of each wheel is determined by calculating the "tire characteristic-considered slip ratio" according to the longitudinal acceleration of the vehicle and the tire characteristic and correcting this "tire characteristic-considered slip ratio" according to the slip ratio of each wheel calculated according to the rotational velocity of each wheel. Therefore, the slip ratio of each wheel can be accurately determined as the "corrected slip ratio". As a result, the accuracy of estimating the slip ratio can be improved.

As a second configuration, a suspension control apparatus includes a longitudinal acceleration detection portion configured to detect a longitudinal acceleration of a vehicle and output a longitudinal acceleration signal, a wheel rotational velocity detection portion configured to detect a rotational velocity of each wheel and output a rotational velocity signal of each wheel, a control device configured to input the longitudinal acceleration signal and the rotational velocity signal of each wheel, determine a tire characteristic-considered slip ratio based on the input longitudinal acceleration signal and a tire characteristic, determine a corrected slip ratio of each wheel by correcting the tire characteristic-considered slip ratio according to the rotational velocity signal of each wheel, estimate a vertical motion of a vehicle body based on the rotational velocity signal of each wheel, correct the estimated vertical motion of the vehicle body based on the corrected slip ratio of each wheel, and output a control signal based on the corrected vertical motion of the vehicle body, and an actuator provided between the vehicle body and a wheel-side member and configured to change a state of the vehicle body in reaction to an input from the wheel-side member according to the control signal.

According to this second configuration, the "corrected slip ratio" of each wheel is determined by correcting the "tire characteristic-considered slip ratio" calculated from the longitudinal acceleration of the vehicle and the tire characteristic according to the rotational velocity of each wheel, and the "vertical motion of the vehicle body" estimated from the rotational velocity of each wheel is corrected based on this "corrected slip ratio". Therefore, the state of the vehicle body in the vertical direction can be accurately determined. As a result, the accuracy of estimating the state of the vehicle body in the vertical direction can be improved. In addition, the suspension control apparatus controls the actuator that changes the state of the vehicle body based on the corrected vertical motion of the vehicle body. Therefore, the ride comfort and the driving stability of the vehicle can be improved.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiments can be replaced with the configuration of another embodiment. Further, some embodiments can also be implemented with a configuration of another embodiment added to the configuration of this embodiment. Further, each embodiment can also be implemented with another configuration added, deleted, or replaced with respect to a part of the configuration of this embodiment.

REFERENCE SIGNS LIST 1 vehicle
2 vehicle body
3 front wheel (wheel)
4 rear wheel (rear wheel)
7,10 shock absorber (actuator)
11 longitudinal acceleration sensor (longitudinal acceleration detection unit)
12 lateral acceleration sensor
13 wheel velocity sensor (wheel rotational velocity detection unit)

14 steering angle sensor
15 yaw rate sensor
16 brake switch
17 CAN
21 suspension control unit (control device)
23 suspension control portion
27 vertical motion estimation portion
38 second slip ratio calculation portion (tire characteristic-considered slip ratio determination unit)
39 slip ratio distribution portion (corrected slip ratio determination unit)
40 third slip ratio calculation portion (corrected slip ratio determination unit)
43 slip state detection apparatus

The invention claimed is:

1. A suspension control apparatus comprising:
a tire characteristic-considered slip ratio determination portion configured to determine a tire characteristic-considered slip ratio, which is a coefficient for correcting a slip ratio of a wheel determined based on a rotational velocity signal of the wheel, based on a longitudinal acceleration of a vehicle detected by a longitudinal acceleration detection portion and a tire characteristic; and
a corrected slip ratio determination portion configured to determine a corrected slip ratio of the wheel by correcting the slip ratio of the wheel according to the tire characteristic-considered slip ratio;and a suspension control portion configured to output a control signal to an actuator between a body of the vehicle and a wheel-side member based at least in part on the tire characteristic-considered slip ratio and the corrected slip ratio.

2. The suspension control apparatus of claim 1, wherein:
the wheel is one of a plurality of wheels;
the tire characteristic-considered slip ratio determination portion is configured to determine the tire characteristic-considered slip ratio of each of the plurality of wheels; and
the corrected slip ratio determination portion configured to determine the corrected slip ratio of each of the plurality of wheels.

3. A suspension control apparatus comprising:
a longitudinal acceleration detection portion configured to detect a longitudinal acceleration of a vehicle and output a longitudinal acceleration signal;
a wheel rotational velocity detection portion configured to detect a rotational velocity of a wheel and output a rotational velocity signal of the wheel;
a control device configured to: (i) input the longitudinal acceleration signal and the rotational velocity signal of the wheel; (ii) determine a tire characteristic-considered slip ratio, which is a coefficient for correcting a slip ratio of the wheel determined based on the rotational velocity signal of the wheel, based on the input longitudinal acceleration signal and a tire characteristic; (iii) determine a corrected slip ratio of the wheel by correcting the slip ratio of the wheel according to the tire characteristic-considered slip ratio; (iv) estimate a vertical motion of a body of the vehicle based on the rotational velocity signal of the wheel; (v) correct the estimated vertical motion of the body of the vehicle based on the corrected slip ratio of the wheel; and (vi) output a control signal based on the corrected vertical motion of the body of the vehicle; and
an actuator between the body of the vehicle and a wheel-side member, the actuator being configured to change a state of the body of the vehicle in reaction to an input from the wheel-side member according to the control signal.

4. The suspension control apparatus of claim 3, wherein:
the wheel is one of a plurality of wheels;
the wheel rotational velocity detection portion is one of a plurality of rotational velocity detection portions for the plurality of wheels, respectively;
the actuator is one of a plurality of actuators for the plurality of wheels, respectively;
the wheel-side member is one of a plurality of wheel-side members for the plurality of wheels, respectively; and
the control device is configured to: (i) input the rotational velocity signal of each of the plurality of wheels; (ii) determine the tire characteristic-considered slip ratio of each of the plurality of wheels; (iii) determine the corrected slip ratio of each of the plurality of wheels; (iv) estimate the vertical motion of the body of the vehicle based on the rotational velocity signal of each of the plurality of wheels; (v) correct the estimated vertical motion of the body of the vehicle based on the corrected slip ratio of each of the plurality of wheels; and (vi) output the control signal based on the corrected vertical motion of the body of the vehicle of one of the plurality of wheels.

* * * * *